US012803828B2

(12) United States Patent
Yao et al.

(10) Patent No.: US 12,803,828 B2
(45) Date of Patent: Nov. 17, 2026

(54) BLOCK CHAIN CONSENSUS METHOD AND APPARATUS, AND COMPUTER DEVICE, MEDIUM AND PRODUCT

(71) Applicant: Tencent Technology (Shenzhen) Company Limited, Shenzhen (CN)

(72) Inventors: Yongxin Yao, Shenzhen (CN); Kemeng Liu, Shenzhen (CN); Dan Xu, Shenzhen (CN); Neng Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 19/212,139

(22) Filed: May 19, 2025

(65) Prior Publication Data

US 2026/0246655 A1 Aug. 20, 2026

Related U.S. Application Data

(63) Continuation of application No. PCT/CN2023/123756, filed on Oct. 10, 2023.

(30) Foreign Application Priority Data

Mar. 8, 2023 (CN) ......................... 202310269139.5

(51) Int. Cl.
*H04L 9/00* (2022.01)
*H04L 9/32* (2006.01)

(52) U.S. Cl.
CPC .............. *H04L 9/50* (2022.05); *H04L 9/3265* (2013.01)

(58) Field of Classification Search
CPC ................................ H04L 9/50; H04L 9/3265
See application file for complete search history.

(56) References Cited

U.S. PATENT DOCUMENTS 11,037,227 B1 * 6/2021 Padilha ................. G06F 21/602
12,256,000 B2 * 3/2025 Wright ...................... H04L 9/30
(Continued)

FOREIGN PATENT DOCUMENTS

CN 110597911 A 12/2019
CN 107807951 B * 10/2020 ......... G06F 16/9024
(Continued)

OTHER PUBLICATIONS

International Search Report (PCT/ISA/210) with English translation issued in PCT Application No. PCT/CN2023/123756 dated Jan. 27, 2024 (5 pages).

*Primary Examiner* — Javier O Guzman
(74) *Attorney, Agent, or Firm* — Crowell & Moring LLP

(57) ABSTRACT

A block chain consensus method is provided, performed by a computer device in which a proposal node in a block chain is located, and includes: acquiring a to-be-consensual transaction block, the to-be-consensual transaction block being generated based on at least one piece of to-be-packaged transaction data; acquiring a hash fingerprint of the proposal node, and performing signature endorsement on the transaction block by using the hash fingerprint of the proposal node, to obtain signature endorsement information, the hash fingerprint being determined after a hash operation is performed on certificate data corresponding to the proposal node; combining the signature endorsement information and the transaction block, to generate a proposal message; and broadcasting the proposal message to at least one verification node in the block chain, to trigger each verification node to reach a consensus, based on the hash fingerprint of the proposal node in the proposal message, on the proposal message.

20 Claims, 7 Drawing Sheets

(56) References Cited

U.S. PATENT DOCUMENTS

| | | | | |
|---|---|---|---|---|
| 2016/0283920 | A1* | 9/2016 | Fisher | H04L 9/3239 |
| 2019/0372956 | A1* | 12/2019 | Breu | H04L 9/0861 |
| 2020/0380154 | A1 | 12/2020 | Jayachandran | |
| 2022/0286275 | A1* | 9/2022 | Davis | G06Q 20/02 |

FOREIGN PATENT DOCUMENTS

| | | | | | |
|---|---|---|---|---|---|
| CN | 107657438 | B | * | 12/2020 | H04L 9/3247 |
| CN | 113256427 | A | | 8/2021 | |
| CN | 113609222 | A | * | 11/2021 | G06F 16/27 |
| CN | 113726525 | A | | 11/2021 | |
| CN | 111047319 | B | * | 12/2021 | G06Q 40/04 |

* cited by examiner

BLOCK CHAIN CONSENSUS METHOD AND APPARATUS, AND COMPUTER DEVICE, MEDIUM AND PRODUCT

RELATED APPLICATION

The present disclosure is a continuation of International Patent Application No. PCT/CN2023/123756, filed Oct. 10, 2023, which claims priority to Chinese Patent Application No. 202310269139.5, filed on Mar. 8, 2023 and entitled "BLOCK CHAIN CONSENSUS METHOD AND APPARATUS, COMPUTER DEVICE, MEDIUM, AND PRODUCT". Both applications are incorporated herein by reference in their entireties.

TECHNICAL FIELD

The present disclosure relates to the field of block chain technologies, and in particular, to a block chain consensus method, a block chain consensus apparatus, a computer device, a computer-readable storage medium, and a computer program product.

BACKGROUND

In a decentralized network environment based on a Byzantine consensus algorithm and the like, consensus nodes are operated by participants dispersed in different regions and different organizations. To prevent an attack from causing a plurality of nodes in a network to be controlled by the same participant and destroying consensus security, a certificate-based security processing manner needs to be used in a block chain scenario such as a consortium chain to perform defense.

Currently, in consideration of security, when consensus nodes in the block chain reach a consensus, a large data amount is occupied for communication, resulting in low consensus efficiency.

SUMMARY

According to embodiments of the present disclosure, block chain consensus method and apparatus, computer device, medium, and product are provided.

According to an aspect, an embodiment of the present disclosure provides a block chain consensus method, performed by a computer device in which a proposal node in a block chain is located, including:

acquiring a to-be-consensual transaction block, the to-be-consensual transaction block being generated based on at least one piece of to-be-packaged transaction data;

acquiring a hash fingerprint of the proposal node, and performing signature endorsement on the transaction block by using the hash fingerprint of the proposal node, to obtain signature endorsement information, the hash fingerprint being determined after a hash operation is performed on certificate data corresponding to the proposal node;

combining the signature endorsement information and the transaction block, to generate a proposal message; and broadcasting the proposal message to at least one verification node in the block chain, to trigger each verification node to reach a consensus, based on the hash fingerprint of the proposal node in the proposal message, on the proposal message.

According to an aspect, an embodiment of the present disclosure provides a block chain consensus method, performed by a computer device in which a verification node a block chain is located in. The method includes:

acquiring a proposal message transmitted by a proposal node, the proposal message being generated after signature endorsement information and a transaction block are combined, the signature endorsement information being determined after signature endorsement is performed on the transaction block based on a hash fingerprint of the proposal node, and the hash fingerprint being determined after a hash operation is performed on certificate data corresponding to the proposal node;

parsing the proposal message to obtain the hash fingerprint of the proposal node, and acquiring the certificate data of the proposal node based on the hash fingerprint; and reaching a consensus on the proposal message based on the acquired certificate data.

According to an aspect, an embodiment of the present disclosure provides a block chain consensus apparatus. The apparatus includes:

an acquisition unit, configured to acquire a to-be-consensual transaction block, the to-be-consensual transaction block being generated based on at least one piece of to-be-packaged transaction data;

a processing unit, configured to: acquire a hash fingerprint of a proposal node, and perform signature endorsement on the transaction block by using the hash fingerprint of the proposal node, to obtain signature endorsement information, the hash fingerprint being determined after a hash operation is performed on certificate data corresponding to the proposal node, and the processing unit being further configured to combine the signature endorsement information and the transaction block, to generate a proposal message; and a transmitting unit, configured to broadcast the proposal message to at least one verification node in the block chain, to trigger each verification node to reach a consensus, based on the hash fingerprint of the proposal node in the proposal message, on the proposal message.

According to an aspect, an embodiment of the present disclosure provides a block chain consensus apparatus. The apparatus includes:

a receiving unit, configured to receive a proposal message transmitted by a proposal node, the proposal message being generated after signature endorsement information and a transaction block are combined, the signature endorsement information being determined after signature endorsement is performed on the transaction block based on a hash fingerprint of the proposal node, and the hash fingerprint being determined after a hash operation is performed on certificate data corresponding to the proposal node; and a processing unit, configured to parse the proposal message to obtain the hash fingerprint of the proposal node, and acquire the certificate data of the proposal node based on the hash fingerprint, and the processing unit being further configured to reach a consensus on the proposal message based on the acquired certificate data.

According to another aspect, an embodiment of the present disclosure further provides a computer device. The computer device includes a memory and a processor, the memory has computer-readable instructions stored therein, and when the computer-readable instructions are executed by the processor, the processor is enabled to perform the method in embodiments of the present disclosure.

According to another aspect, an embodiment of the present disclosure provides a non-transitory computer-readable storage medium. The computer-readable storage medium stores computer-readable instructions stored thereon, and when the computer-readable instructions executed by a processor, the processor is enabled to perform the method in embodiments of the present disclosure.

According to another aspect, an embodiment of the present disclosure further provides a computer program product. The computer program product includes computer-readable instructions, and when the computer-readable instructions are executed by a processor, the processor is enabled to perform the method in embodiments of the present disclosure.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To describe the technical solutions in embodiments of the present disclosure more clearly, the following briefly describes the accompanying drawings for describing embodiments or conventional technologies. Apparently, the accompanying drawings in the following descriptions show merely some embodiments of the present disclosure, and a person of ordinary skill in the art may still derive other accompanying drawings from these disclosed accompanying drawings without creative efforts.

DETAILED DESCRIPTION

Figure 1:
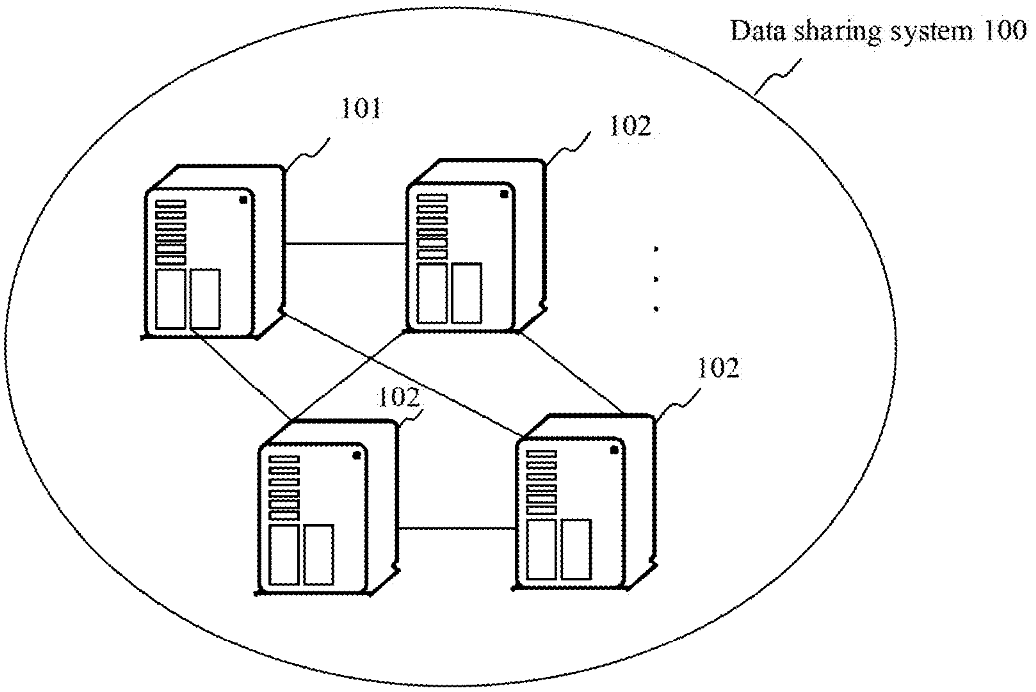
FIG. 1 is a schematic diagram of a structure of a block chain system according to an embodiment of the present disclosure.

The technical solutions in embodiments of the present disclosure are described below with reference to the accompanying drawings in embodiments of the present disclosure. Apparently, the described embodiments are merely some rather than all of embodiments of the present disclosure. All other embodiments obtained by a person of ordinary skill in the art based on embodiments of the present disclosure without creative efforts shall fall within the protection scope of the present disclosure.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The following implementations described in the following exemplary embodiments do not represent all implementations that are consistent with the present disclosure. On the contrary, the implementations are merely examples of the apparatus and methods that are described in detail in the appended claims and that are consistent with some aspects of the present disclosure.

The present disclosure provides a block chain consensus solution. In the block chain consensus solution, when a proposal message is constructed, complete certificate data (that is, a node certificate or a public key) may be replaced with a hash fingerprint (for example, a hash fingerprint of a node certificate or a hash fingerprint of a public key) of a proposal node to perform signature endorsement on a block, thereby reducing a data amount ratio of signature endorsement information in the proposal message, reducing a data amount of the constructed proposal message, reducing internal memory occupation, and improving consensus efficiency.

Specifically, a principle of the block chain consensus solution provided in the present disclosure is approximately as follows. When the proposal message is constructed, the proposal node first packages to-be-packaged transaction data to obtain a transaction block, then performs signature endorsement on the transaction block based on a hash fingerprint of the proposal node to determine signature endorsement information, and then performs construction based on the signature endorsement information and the transaction block to obtain the proposal message. During a block consensus, after receiving the proposal message transmitted by the proposal node, a verification node may parse the hash fingerprint of the proposal node in the proposal message, and acquire complete certificate data of the proposal node based on the hash fingerprint. Finally, the verification node reaches a consensus on the proposal message based on the acquired complete certificate data. It can be learned that the proposal message constructed during the consensus is generated after the signature endorsement is performed based on the hash fingerprint of the proposal node. Compared with performing signature endorsement based on the complete certificate data of the proposal node, a data amount occupied by the hash fingerprint is smaller, thereby reducing a volume of the proposal message. Further, an amount of data transmission can also be reduced by using a proposal message with a small volume during data transmission, thereby improving consensus efficiency. In addition, rapid and stable transmission of the proposal message can accelerate a consensus between nodes, further improving consensus efficiency.

Next, related technical terms related to the block chain consensus solution provided in the present disclosure are described in detail with reference to the related accompanying drawings.

I. Block Chain Technology

A block chain is essentially a decentralized database, and is a string of data blocks generated by using a cryptographic method. Each data block includes related information, to verify validity (anti-counterfeiting) of the information of the data block and generate a next block.

(1) Block Chain System

FIG. 1 is a schematic diagram of a structure of a block chain system according to an embodiment of the present disclosure. As shown in FIG. 1, the block chain system may be a data sharing system. The data sharing system is a system configured to share data between nodes. The data sharing system 100 may include a block chain node 101 and at least one block chain node 102. The block chain node 101 may be a proposal node (which may also be referred to as a primary node or a leader node). The block chain node 102 may be a verification node (which may also be referred to as a secondary node or a follower node). The proposal node may be a node selected by all consensus nodes in a block chain network based on a consensus algorithm. The proposal node and the verification node are collectively referred to as a consensus node. Any block chain node may refer to a computer device in the data sharing system 100, and the computer device may be, for example, a terminal device or a server. Nodes in the data sharing system 100 may form a peer-to-peer (P2P) network. A P2P protocol is an application layer protocol running on a transmission control protocol (TCP), and the foregoing data sharing system is maintained based on the TCP protocol.

In this embodiment of the present disclosure, the proposal node 101 may generate a proposal message corresponding to a transaction block, and the proposal node 101 broadcasts the proposal message to each verification node 102 in a block chain, thereby implementing a related process of a block chain consensus. Therefore, how to reach a block consensus between nodes (the proposal node and the verification node) in the block chain system and related functions implemented by the nodes are correspondingly described below.

① Block Consensus Between the Proposal Node and the Verification Node

Specifically, to ensure information interworking in the block chain system, each node in the block chain system may have an information connection, and the nodes may transmit information through the information connection. The information connection is not limited to a specific connection manner. For example, the information connection may be a direct or indirect connection in a wired communication manner, or may be a direct or indirect connection in a wireless communication manner, or may be a connection in another connection manner. This is not limited in the present disclosure herein.

When performing normal work, each block chain node (the proposal node 101 or the verification node 102) may receive input information, and maintain shared data in the data sharing system based on the received input information. For example, when the proposal node 101 in the block chain system receives input information (for example, the proposal node may receive at least one piece of transaction data transmitted by a user client), the proposal node 101 may package a plurality of pieces of received transaction data to generate a transaction block, and then signs the transaction block based on a hash fingerprint of the proposal node, to generate a proposal message corresponding to the transaction block. For another example, the verification node 102 may also receive input information (for example, a proposal message transmitted by the proposal node 101), and the verification node 102 may obtain a hash fingerprint in the proposal message through parsing, acquire complete certificate data of the proposal node based on the hash fingerprint, and finally reach a consensus on the proposal message based on the complete certificate data. Finally, after the proposal node 101 and the verification nodes 102 in the block chain reach a consensus on the proposal message, both the proposal node 101 and the verification node 102 may store the transaction block, to maintain the shared data (each piece of transaction data) in the data sharing system.

② Functions of the Nodes a. An application function is configured for being deployed in a block chain, implementing a specific service based on an actual service requirement, and recording data related to function implementation to form recorded data (transaction data). For example, the transaction data may be data configured for implementing a resource transfer service. For another example, the transaction data may be data configured for implementing an electronic invoice service. For another example, the transaction data may be data configured for implementing a game service, and so on. A digital signature (for example, signature endorsement information used for the transaction block by the proposal node based on certificate data such as a node certificate or a public key) may be carried in the recorded data to indicate a source of task data, and the recorded data may be transmitted to another verification node in the block chain system, so that the another verification node adds the recorded data to a temporary block when verification on a source and integrity of the recorded data succeeds. Subsequently, after a consensus reached by the proposal node and the verification nodes on the transaction block succeeds, a transaction block including each piece of transaction data may be added to the block chain.

b. A routing function is a basic function of any node in the block chain system, and is configured for supporting communication between nodes. Specifically, during the foregoing block consensus between the proposal node 101 and the verification node 102, data exchange between the nodes is involved. During the data exchange, the data exchange between the nodes is implemented based on a routing function of each node.

③ Node Identifier

Each node (the proposal node and the verification node) in the block chain system has a node identifier corresponding to the node, and each node in the block chain system may store a node identifier of another node in the block chain system, to subsequently broadcast a generated block to the another node in the block chain system based on the node identifier of the another node. Each node may maintain a node identifier list shown in the following table, and a node name and a node identifier are correspondingly stored in the node identifier list.

The node identifier may be an internet protocol (IP, a protocol for interconnecting between networks) address and any other information that can be configured for identifying the node. The IP address is merely used as an example for description in Table 1.

TABLE 1

Node identifier list

| Node name | Node identifier |
|---|---|
| Node 1 | 000.000.000.000 |
| Node 2 | 111111111111 |
| . . . | . . . |
| Node N | xxx.xxx.xxx.xxx |

In this embodiment of the present disclosure, during data exchange performed by each node in the block chain system (for example, during data exchange in which the proposal node transmits the proposal message to the verification node), the node may carry a respective node identifier, so that another node may perform node verification based on a corresponding node identifier before reaching a consensuses, thereby improving security of a block chain consensus process.

(2) Block

The present disclosure mainly relates to a block consensus. Before the block consensus is performed, the proposal node needs to generate a corresponding transaction block based on the transaction data, so that the verification node subsequently reaches the block consensus on the transaction block. Therefore, how to generate a block and a structure of the block are separately described in detail below.

① Generation of a Block

Figure 2:
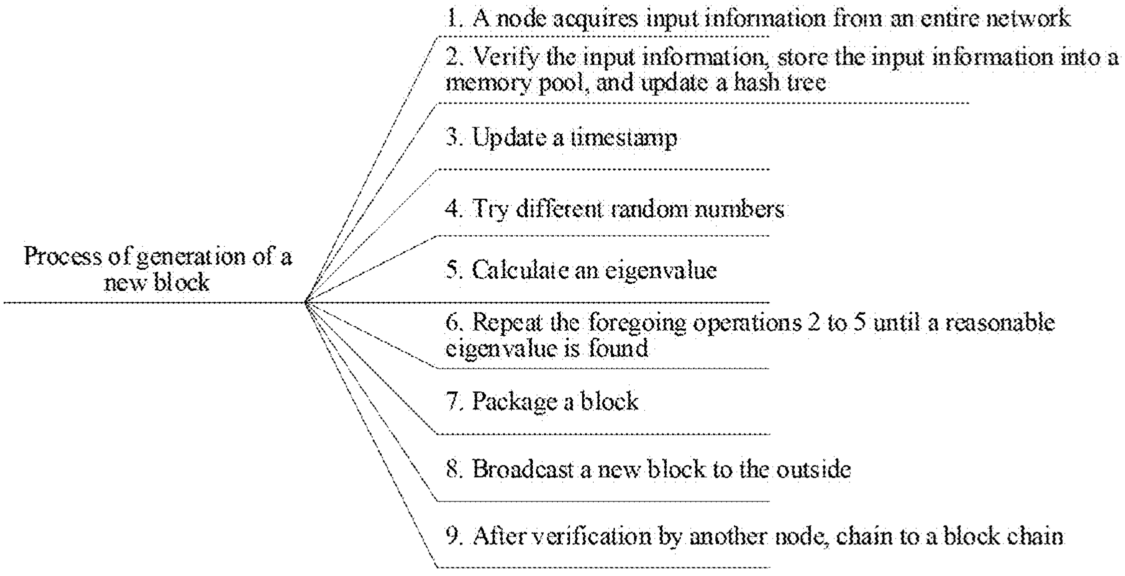
FIG. 2 is a schematic flowchart of generation of a block according to an embodiment of the present disclosure.

FIG. 2 is a schematic flowchart of generation of a block according to an embodiment of the present disclosure. As shown in FIG. 2, during generation of a transaction block in a block chain, when receiving input information (transaction data), a proposal node may check the input information, store the input information into a memory pool (a transaction pool) after completing the checking, and update a hash tree used by the proposal node for recording the input information. Then, an update timestamp is updated to time when the input information is received, different random numbers are tried, and an eigenvalue is calculated for a plurality of times, so that the calculated eigenvalue can satisfy the following formula:

$$SHA256(SHA256(\text{version}+\text{prev\_hash}+\text{merkle}_{root}+ntime+nbits+x))<\text{TARGET}$$

SHA256 is an eigenvalue algorithm configured for calculating an eigenvalue. version is version information of a related block protocol in the block chain. prev_hash is a block header eigenvalue of a parent block of a current block. merkle_root is an eigenvalue of the input information. ntime is update time of the update timestamp. nbits is current difficulty, which is a fixed value for a period of time and is determined again after a fixed period of time. x is a random number. TARGET is an eigenvalue threshold, and the eigenvalue threshold may be determined according to nbits.

In this way, when the random number satisfying the foregoing formula is obtained through calculation, information may be correspondingly stored, and a block header and a block body are generated, to obtain a current transaction block. Subsequently, the proposal node separately transmits, based on a node identifier of another node (a verification node) in a data sharing system, a proposal message of a newly generated transaction block to a verification node in the data sharing system in which the proposal node is located. The verification node reaches a consensus on the transaction block, and adds, after the consensus is finished, the newly generated transaction block to a block chain in which the transaction block is stored.

② Structure of a Block

Figure 3:
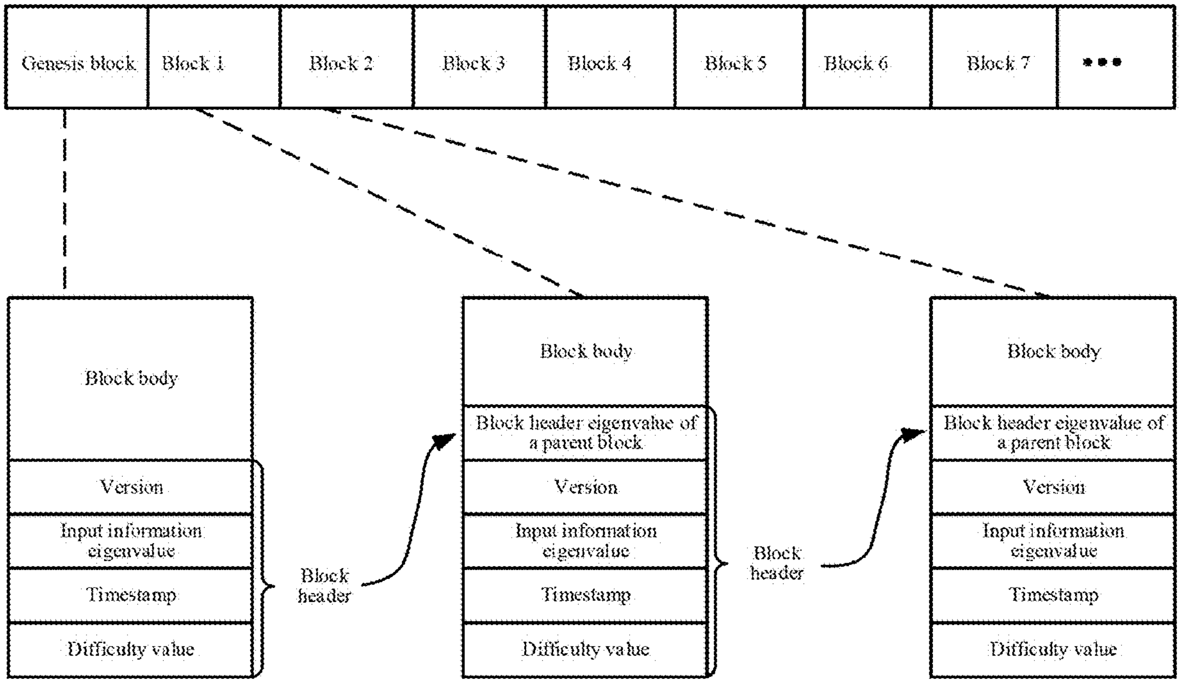
FIG. 3 is a schematic diagram of a structure of a block chain according to an embodiment of the present disclosure.

FIG. 3 is a schematic diagram of a structure of a block chain according to an embodiment of the present disclosure. As shown in FIG. 3, a block chain includes a plurality of blocks, and each block chain includes a genesis block. As the name implies, the genesis block is the first block and an initial block. The genesis block includes a block header and a block body, the block header stores an input information eigenvalue, a version, a timestamp, and a difficulty value, and the block body stores input information (for example, each piece of transaction data). The genesis block is used as a parent block of a next block of the genesis block. The next block also includes a block header and a block body. The block header stores an input information eigenvalue of a current block, a block header eigenvalue of the parent block, a version, a timestamp, and a difficulty value, and so on. In this way, block data stored in each block in the block chain is associated with block data stored in the parent block, thereby ensuring security of the transaction data in the block.

In this embodiment of the present disclosure, when the proposal message is constructed, the proposal node may package voting qc (quorum certificate) data of a previous block into a proposal. Based on the structure of the block chain, subsequently, after receiving the proposal message, a verification node may verify, based on the voting qc data in the proposal, that a parent block (the previous block) cited by the current block reaches a consensus between most nodes, thereby ensuring reliability of block chain consensus.

II. Cloud Technology

In a block chain consensus solution of the present disclosure, a lot of data computing and data storage services is involved in a block chain. Therefore, a lot of computer operation costs are required. In this way, in the present disclosure, specific operations involved during block chain consensus may be implemented based on a cloud storage technology in a cloud technology, and specifically include: For example, signature endorsement may be performed on a transaction block by using a hash fingerprint of a proposal node based on a data computing service provided by the cloud storage technology. For another example, after a block consensus on a proposal message succeeds, certificate data of the proposal node may be stored into a DB database based on a data storage service provided by the cloud storage technology.

The cloud technology is a collective name of a network technology, an information technology, an integration technology, a platform management technology, an application technology, and the like based on a cloud computing business mode application, and may form a resource pool, to satisfy what is needed in a flexible and convenient manner. The cloud technology may include a cloud storage technology. The cloud storage is a new concept extended and developed from the concept of cloud computing. A distributed cloud storage system (referred to as a storage system for short below) is a storage system integrating, through functions such as a cluster application, a grid technology, and a distributed access file system, a large quantity of different types of storage devices (where the storage device is also referred to as a storage node) in a network through application software or an application interface, to work collaboratively and jointly provide data storage and service access functions to the outside.

In the subsequent specific implementations of the present disclosure, data related to user information is involved. In a case that embodiments of the present disclosure are applied to a specific product or technology, permission or consent of an object is required, and collection, use, and processing of the relevant data need to comply with relevant laws, regulations, and standards of relevant countries and regions.

Figure 4:
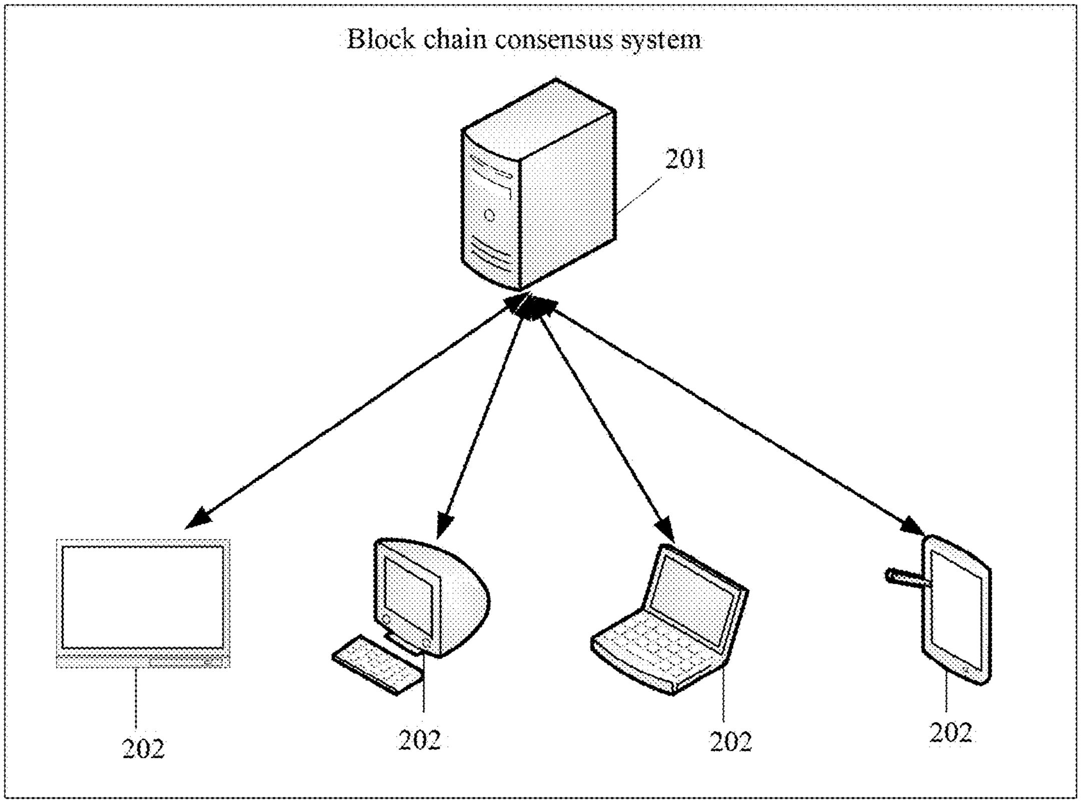
FIG. 4 is a schematic diagram of a structure of a block chain consensus system according to an embodiment of the present disclosure.
Figure 5:
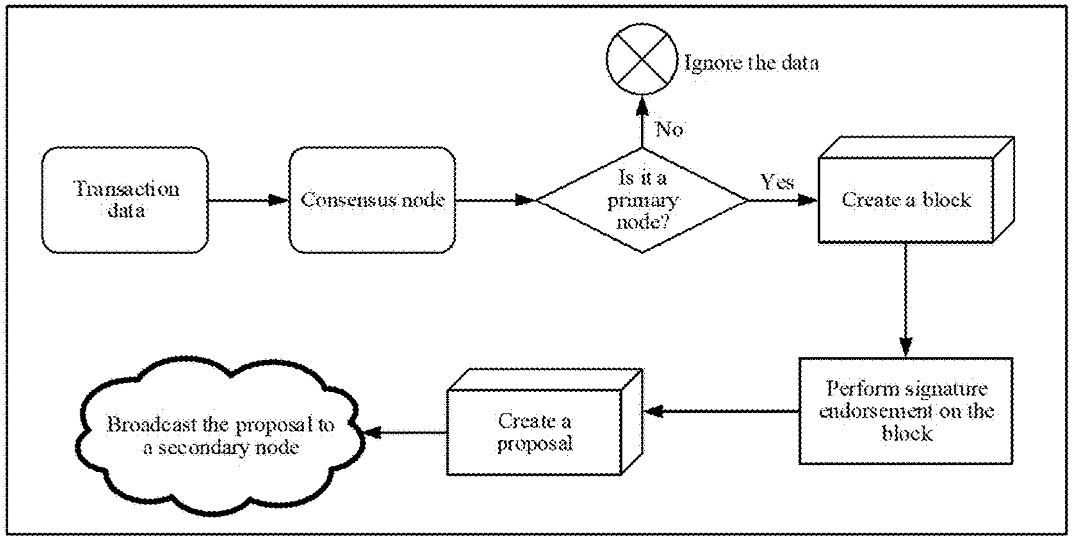
FIG. 5 is a schematic diagram of a consensus process of a proposal node according to an embodiment of the present disclosure.
Figure 6:
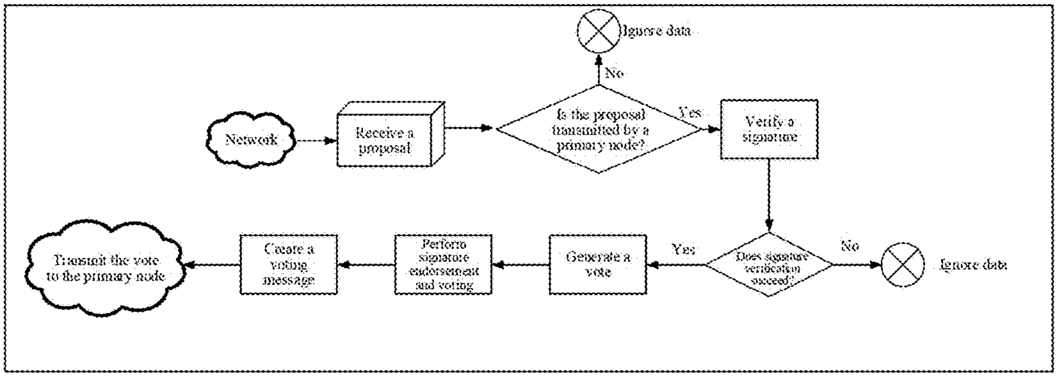
FIG. 6 is a schematic diagram of a consensus process of a verification node according to an embodiment of the present disclosure.

With reference to the foregoing descriptions about the block chain consensus solution provided in the present disclosure and the related technical terms, the following specifically describes an architecture of a block chain consensus system according to an embodiment of the present disclosure with reference to FIG. 4 to FIG. 6.

FIG. 4 is a schematic diagram of an architecture of a block chain consensus system according to an embodiment of the present disclosure. The architecture of the block chain consensus system may include at least a proposal node 201 and at least one verification node 202. The proposal node 201 and the verification node 202 may both be collectively referred to as a consensus node in the block chain system. The consensus node is a node responsible for maintaining data consistency of an entire block chain network. Generally, in a plurality of corresponding consensus nodes during block consensus, there is one proposal node 201 (also referred to as a primary node), and there are a plurality of verification nodes 202 (also referred to as secondary nodes). Specifically, the proposal node may be a node selected by all consensus nodes in the block chain network based on a consensus algorithm (for example, a BFT consensus algorithm of HotStuff, the HotStuff is a consensus protocol based on a View, the View represents a consensus unit, and a consensus process includes Views one by one). One proposal node exists in one View to dominate the consensus protocol, a consensus is reached through three-phase voting, and then the View is switched to a next View to continue to reach a consensus). The verification node is a consensus node other than the proposal node in the block chain network. In addition, a communication connection may be established between the proposal node 201 and each verification node 202 in a wired or wireless manner.

First, respective corresponding consensus processes of the proposal node 201 and the verification node 202 during block chain consensus are respectively described with reference to FIG. 5 and FIG. 6.

① Consensus Process of the Proposal Node 201

FIG. 5 is a schematic diagram of a consensus process of a proposal node according to an embodiment of the present disclosure. As shown in FIG. 5, transaction data transmitted by a user may be uploaded to a consensus node in a block chain for reaching a consensus. After receiving the transaction data, the consensus node may determine whether the transaction data is the proposal node in a current view state, and if the transaction data is not the proposal node, the consensus node ignores the transaction data, that is, does not perform any operation on the transaction data. If the transaction data is the proposal node, a transaction block is created based on the transaction data, a proposal message is generated after signature endorsement is performed on the transaction block, and finally the proposal message is broadcast to each secondary node in the block chain. It can be learned that the proposal node plays a key role in one round block consensus. If the proposal node works maliciously and packages invalid transaction data, or a block structure is incorrect, a consensus cannot be reached on any block during the consensus.

② Consensus Process of the Verification Node 202

FIG. 6 is a schematic diagram of a consensus process of a verification node according to an embodiment of the present disclosure. As shown in FIG. 6, after a proposal message transmitted by the proposal node 201 is received, it is determined whether the proposal message is transmitted by the proposal node in a current view, and if the proposal message is not transmitted by the proposal node in the current view, the proposal message is ignored, that is, no operation is performed on the proposal message. If the proposal message is transmitted by the proposal node in the current view, verification is performed on a signature of the proposal message. If the verification of the signature succeeds, voting is performed, and a voting message is generated after the signature. Specifically, when verifying that the proposal message is from a specified proposal node, and a user transaction execution result included in a transaction block is consistent with the proposal node, the verification node constructs a voting message by using a hash fingerprint of a block in the proposal, calculates a hash fingerprint of the voting message for signature, then adds signature endorsement to the voting message, transmits the voting message to the proposal node, indicating that the verification node approves the current proposal message. After the proposal node receives at least 2f+1 agreement votes, consensus nodes reach a consensus on the current proposal and enter a next view state. f is a quantity of faulty nodes (or referred to as malicious nodes) in the block chain system, and there are at least 3f+1 formula nodes in the block chain system.

The proposal node 201 and the verification node 202 may be, but are not limited to, a mobile phone, a tablet computer, a notebook computer, a palmtop computer, a mobile internet device (MID), an intelligent voice interaction device, an on-board terminal, a roadside device, an aircraft, a wearable device, smart home appliance, a wearable device that has a block chain consensus function, such as a smartwatch, a smartband, or a pedometer, or the like. The proposal node 201 and the verification node 202 may alternatively be an independent physical server, or a server cluster or distributed system including a plurality of physical servers, or may be a cloud server providing basic cloud computing services such as a cloud service, a cloud database, cloud computing, a cloud function, cloud storage, a network service, cloud communication, a middleware service, a domain name service, a security service, a content delivery network (CDN), and big data and an artificial intelligence platform.

In a possible implementation, an interaction process between the proposal node 201 and the verification node 202 is used as an example to describe the block chain consensus solution provided in the foregoing embodiment of the present disclosure. First, the proposal node 201 may acquire at least one piece of to-be-packaged transaction data, and package the acquired transaction data to generate a transaction block. Then, the proposal node 201 may perform signature endorsement on the transaction block based on a hash fingerprint, to obtain signature endorsement information. The hash fingerprint is determined after a hash operation is performed based on certificate data of the proposal node. Next, the proposal node 201 combines the signature endorsement information and the transaction block into a proposal message, and broadcasts the proposal message to the verification node 202 in the block chain. Subsequently, after receiving the proposal message transmitted by the proposal node 201, the verification node 202 may parse a hash fingerprint in the proposal message, and acquire complete certificate data of the proposal node based on the hash fingerprint. Finally, a consensus is reached on the proposal message based on the acquired certificate data. One piece of transaction data may be data needed for one transaction.

The block chain consensus system described in embodiments of the present disclosure is intended to describe the technical solutions in embodiments of the present disclosure more clearly, and does not constitute a limitation on the technical solutions provided in embodiments of the present disclosure. A person of ordinary skill in the art may learn that, with evolution of a system architecture and emergence of a new service scenario, the technical solutions provided in embodiments of the present disclosure are also applicable to similar technical problems.

Based on the foregoing related descriptions of the block chain consensus solution and the block chain consensus system in the present disclosure, specific embodiments related to the block chain consensus solution are described in detail below with reference to the accompanying drawings.

Figure 7:
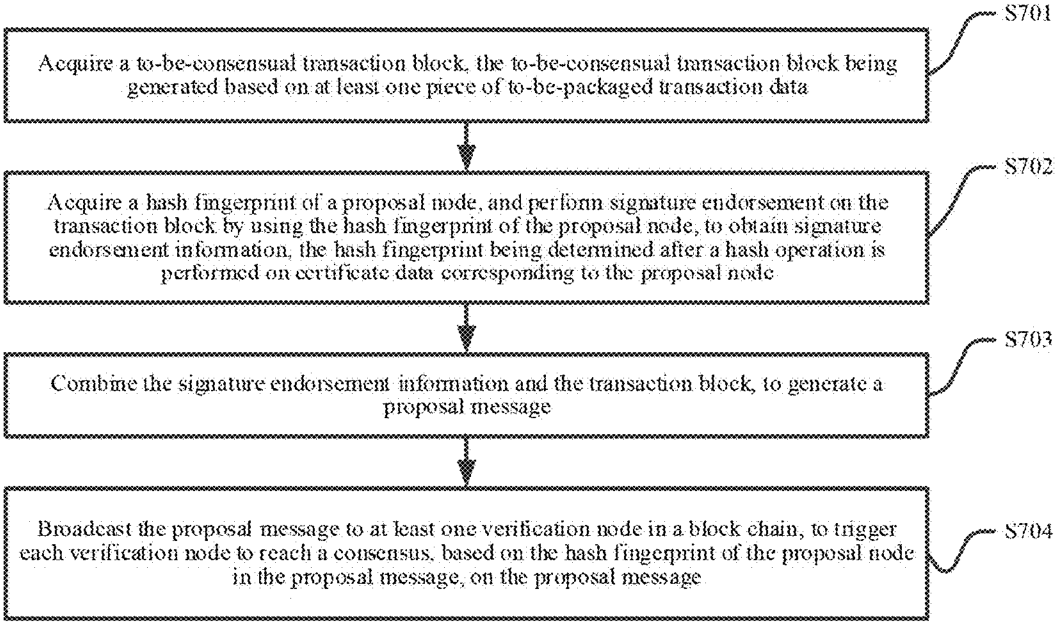
FIG. 7 is a schematic flowchart of a block chain consensus method according to an embodiment of the present disclosure.

FIG. 7 is a schematic flowchart of a block chain consensus method according to an embodiment of the present disclosure. The method is applied to the proposal node in the block chain consensus system shown in FIG. 4, and may be performed by a computer device in which the proposal node in the block chain is located, that is, may be performed by a computer device implementing a function of the proposal node. The block chain consensus method mainly includes but is not limited to the following operations S701 to S704.

S701: Acquire a to-be-consensual transaction block, the to-be-consensual transaction block being generated based on one or more pieces of to-be-packaged transaction data.

In a possible implementation, the proposal node may acquire at least one piece of to-be-packaged transaction data from a transaction pool, and then package the acquired transaction data, to obtain the transaction block. In one embodiment, in a process of packaging the acquired transaction data to generate the transaction block, the proposal node may first acquire a preset quantity of pieces of transaction data, and then package the preset quantity (for example, 100) of pieces of transaction data to generate the transaction block. Alternatively, in a process of packaging the acquired transaction data to generate the transaction block, the proposal node may further acquire received transaction data in a preset time period (for example, one hour), and then package each piece of transaction data received in the preset time period to generate the transaction block.

In a possible implementation, the proposal node may acquire the transaction data from a batch transaction pool in batches, that is, transaction batches stored in the batch transaction pool. The transaction batch refers to a set including at least one piece of transaction data. Then, the acquired transaction batch is packaged to generate the transaction block. In this manner, efficiency of block construction can be improved by using a manner in which transaction data is acquired by using a transaction batch as a unit and a transaction block is constructed.

S702: Perform signature endorsement on the transaction block by using a hash fingerprint of the proposal node, to obtain signature endorsement information, the hash fingerprint being determined after a hash operation is performed on certificate data corresponding to the proposal node.

Specifically, the certificate data of the proposal node is data configured for identifying an identity of the proposal node, and the certificate data may include, for example, content such as a node certificate and a node public key. Specifically, the node certificate may include content such as start time of certificate issuance, expiration time of a certificate, and an organization role corresponding to the proposal node. The node certificate is a digital certificate (for example, a CA certificate) that has an authoritative property and that is issued by a certificate issuing authority (that is, an authority having credibility) to the proposal node. One node corresponds to one node certificate. In addition, a data type of the node certificate may include, but is not limited to, a table, a document, a file, and the like.

Specifically, a principle of the signature endorsement is approximately as follows: Each node (a proposal node and a verification node) participating in a consensus process has a corresponding public key pair and private key pair and a node certificate (collectively referred to as certificate data). When generating a proposal message or a voting message, the node performs signature based on a hash fingerprint of a corresponding message, uses signature endorsement information formed by a signature result and the certificate data (a user certificate/a public key) as anti-counterfeiting data, and adds the signature endorsement information to a corresponding proposal message (or a voting message), to identify that the proposal message (the voting message) is transmitted by the node itself. In conclusion, signature endorsement is a means for identifying an identity of a node, and another node may check a source of a message based on signature endorsement information.

In a possible implementation, the proposal node may transmit a node certificate request to the certificate issuing authority. The node certificate request carries identity information (such as a node identifier) of the proposal node. After checking of the identity information of the proposal node succeeds, the certificate issuing authority may generate a corresponding node certificate for the proposal node. Subsequently, the proposal node may locally store a node certificate of the proposal node, to facilitate signature endorsement on the transaction block based on a hash fingerprint of the node certificate.

The hash fingerprint refers to data determined after the hash operation is performed on the certificate data of the proposal node. Specifically, the certificate data may be calculated based on a hash algorithm (for example, an algorithm such as MD5, SHA-1, SHA-256, or SHA-512) to obtain the hash fingerprint. Therefore, a data amount corresponding to the hash fingerprint of the proposal node is smaller than a data amount corresponding to the certificate data of the proposal node.

In a possible implementation, before signature endorsement is performed on the transaction block by using the hash fingerprint of the proposal node, the proposal node may further serialize the transaction block, to obtain a serialized transaction block. Then, signature endorsement is performed on the serialized transaction block based on the hash fingerprint of the proposal node, to obtain signature endorsement information. The serialization means that a transaction block is serialized into a binary array. By using such a serialization manner, data processing and transmission efficiency can be facilitated, thereby improving construction efficiency of the proposal message.

In a possible implementation, the hash fingerprint and the corresponding certificate data of the proposal node may be associated and stored into a local database (a DB database, hereinafter also referred to as a contract database) of the node. For example, the hash fingerprint and the certificate data are stored in a storage format of K (key)—V (value). The hash fingerprint of the node is used as a key, and the certificate data is used as a value. Before the hash fingerprint and the certificate data of the node are associated and stored, block chain chaining needs to be first performed on certificate data of each node. Next, the proposal node is used as an example. A specific process of performing chaining on the certificate data of the proposal node is described in detail.

(1) First, the proposal node may receive contract calling transaction data transmitted by an operation node. The contract calling transaction data includes a contract identifier of a system contract. The system contract may be created by the proposal node after the proposal node receives the contract calling transaction data, or may be created by the operation node when the operation node constructs a block chain. This is not limited in this embodiment of the present disclosure.

(2) Subsequently, signature endorsement is performed on a packaged transaction block based on certificate data of the proposal node, to generate a to-be-on-chained node proposal. Block chain chaining is performed on the certificate data of the proposal node based on the contract identifier of the system contract if it is determined that a block chain consensus on the node proposal succeeds. The contract identifier is configured for indicating the proposal node and any verification node to store certificate data of the proposal node into respective contract databases. The contract database maintains the system contract indicated by the contract identifier.

(3) Next, after the signature endorsement is performed on the packaged transaction block based on the certificate data of the proposal node, to generate the to-be-on-chained node proposal, the specific process further includes: The to-be-on-chained node proposal is broadcast to at least one verification node in the block chain, to trigger each verification node to perform block chain chaining on the certificate data corresponding to the proposal node; a voting result transmitted by each verification node is received, and the voting result is generated after any verification node reaches a consensus on the to-be-on-chained node proposal; and a hash fingerprint of the certificate data of the proposal node is acquired, and the certificate data and the hash fingerprint of the proposal node are associated and stored into the contract database of the proposal node, if it is determined, based on each received voting result, that a block chain consensus on the node proposal succeeds.

Figure 8:
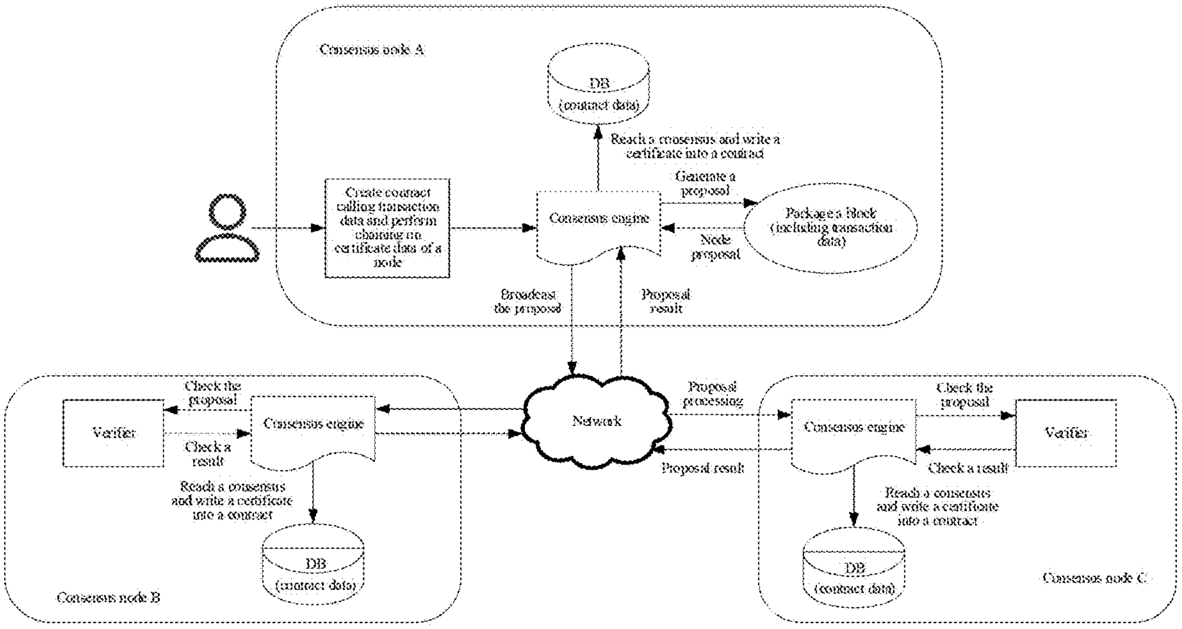
FIG. 8 is a schematic flowchart of performing certificate data chaining according to an embodiment of the present disclosure.

As an example, FIG. 8 is a schematic flowchart of performing certificate data chaining according to an embodiment of the present disclosure. As shown in FIG. 8, a node operator may create contract calling transaction data and transmit the contract calling transaction data to a block chain network. The contract calling transaction data is configured for indicating to call a specified system contract. Consensus nodes (for example, a consensus node A, a consensus node B, and a consensus node C) in the block chain network select a proposal node corresponding to a current view based on a consensus algorithm, and it is assumed that the proposal node is the consensus node A (where the consensus node A is also referred to as the proposal node). Specifically, ① after receiving the contract calling transaction data, the consensus node A may first package the contract calling transaction data into a transaction block. For example, the consensus node A may add the contract calling transaction data to a to-be-packaged transaction block. For another example, the consensus node A may create a new block and add the contract calling transaction data to the created new block to form a packaged transaction block. Then, the consensus node A (which may be specifically executed by a consensus engine) may perform signature endorsement on the packaged transaction block based on certificate data (a node certificate or a node public key) of the consensus node A. After signature is performed on the transaction block, a full node certificate/node public key is used as a part of signature endorsement of a proposal, to generate a node proposal. Finally, the node proposal is broadcast to other verification nodes (the consensus node B and the consensus node C) in the consensus network.

② After receiving the node proposal including the contract calling transaction data, the consensus node B (or the consensus node C) checks validity a source of the proposal by using a complete node certificate, signature, and block data in the signature endorsement of the node proposal (that is, checks whether the current node proposal is transmitted by a proposal node in a current view, checks whether the signature of the proposal is obtained through a signature of the current proposal node, and the like). In addition, validity of the block data in the proposal may be further checked after identity verification succeeds (for example, whether the block data includes a sensitive transaction, an illegal transaction, and the like is checked, if neither the sensitive transaction nor the invalid transaction is included, it is determined that the block data in the proposal is valid, and if both the sensitive transaction and the invalid transaction are included, it is determined that the block data in the proposal is invalid). Finally, after checking of both the source and the block data succeeds, the consensus node B may generate a voting result including an agreement vote, and transmit the voting result to the proposal node. A specific process of consensus on the node proposal reached by each verification node is the same. Details are not described herein again in embodiments of the present disclosure.

③ The consensus node A receives the voting result transmitted by each verification node (the consensus node B and the consensus node C), and determines, based on the received voting result, whether the current node proposal reaches block chain consensus. A specific determining method may be: if the consensus node A receives 2f+1 agreement votes (where f is a quantity of malicious nodes in the block chain, and the malicious node may also be referred to as a faulty node), it may be determined that the current node proposal satisfies a consensus condition, that is, it is determined that the consensus on the node proposal succeeds. In a possible implementation, if the consensus node A determines, based on each received voting result, that the consensus on the node proposal succeeds, the consensus node A generates a notification message indicating that the consensus on the node proposal succeeds. The notification message may carry the contract identifier of the system contract. The consensus node A transmits the notification message to the verification nodes in the block chain, and the notification message is configured for triggering any verification node to store the certificate data of the proposal node into the respective contract databases corresponding to the verification node. A system contract maintained in a contract database of any verification node records: the hash fingerprint and the certificate data associated and stored for the proposal node. In other words, after the consensus on the node proposal succeeds, and after block chain chaining is performed on the block data in the proposal, the certificate data of the proposal node may be further stored into contract databases (DB databases) of the consensus nodes (for example, the consensus node A, the consensus node B, and the consensus node C), to complete the block chain chaining of the certificate data of the proposal node. In the contract database, the certificate data and the hash fingerprint (which is determined after a hash operation is performed on the certificate data) of the proposal node may be associated and stored.

In this manner, complete certificate data of a node on any other chain may be stored into the system contract in a contract database of each node. In one embodiment, the system contract may further record a node identifier of a corresponding node. As shown in the following Table 2, a storage format of the system contract maintained in the contract database of any node is as follows:

TABLE 2

Storage format of a system contract

| Node identifier | Hash fingerprint | Certificate data |
|---|---|---|
| id1 | hash1111 | Node certificate 1 and public key 1 |
| id2 | hash2222 | Node certificate 2 and public key 2 |
| id3 | hash3333 | Node certificate 3 and public key 3 |
| . . . | . . . | . . . |

In addition, the chaining process of the certificate data is applicable to any node. For example, in this embodiment of the present disclosure, after the certificate data of the consensus node A is on chain successfully, block chain chaining may be performed on certificate data of the consensus node B, and after the certificate data of the consensus node B is on chain successfully, block chain chaining may be performed on certificate data of the consensus node C, and so on. For details of a process of performing chaining on certificate data of any node, reference may be made to the foregoing process of performing chaining on the certificate data of the consensus node A. Details are not described herein again in embodiments of the present disclosure.

Based on this, compared with performing signature endorsement based on complete certificate data of a node, performing signature endorsement on a transaction block based on a hash fingerprint of the node can reduce a data amount occupied by signature endorsement information, thereby reducing a data amount of a generated proposal message. Further, during data transmission, efficiency of the block chain consensus can be improved based on a proposal message with a small data amount. In addition, a node certificate chaining transaction is similar to a conventional user transaction, and both the node certificate chaining transaction and the conventional user transaction use the same transmitting and consensus process, so that a probability of causing a BUG due to a change can be reduced.

S703: Combine the signature endorsement information and the transaction block, to generate a proposal message.

During specific implementation, that the proposal node combines the signature endorsement information and the transaction block, to generate the proposal message may specifically include: For example, the signature endorsement information and the transaction block may be compressed, and the compressed signature endorsement information and the transaction block are packaged, to obtain the proposal message. For another example, the signature endorsement information may be added to a block body of the transaction block, to obtain the proposal message through construction. For another example, an extended field may be created for the transaction block, and then the signature endorsement information is added to the extended field of the transaction block, to generate the proposal message.

Figure 9:
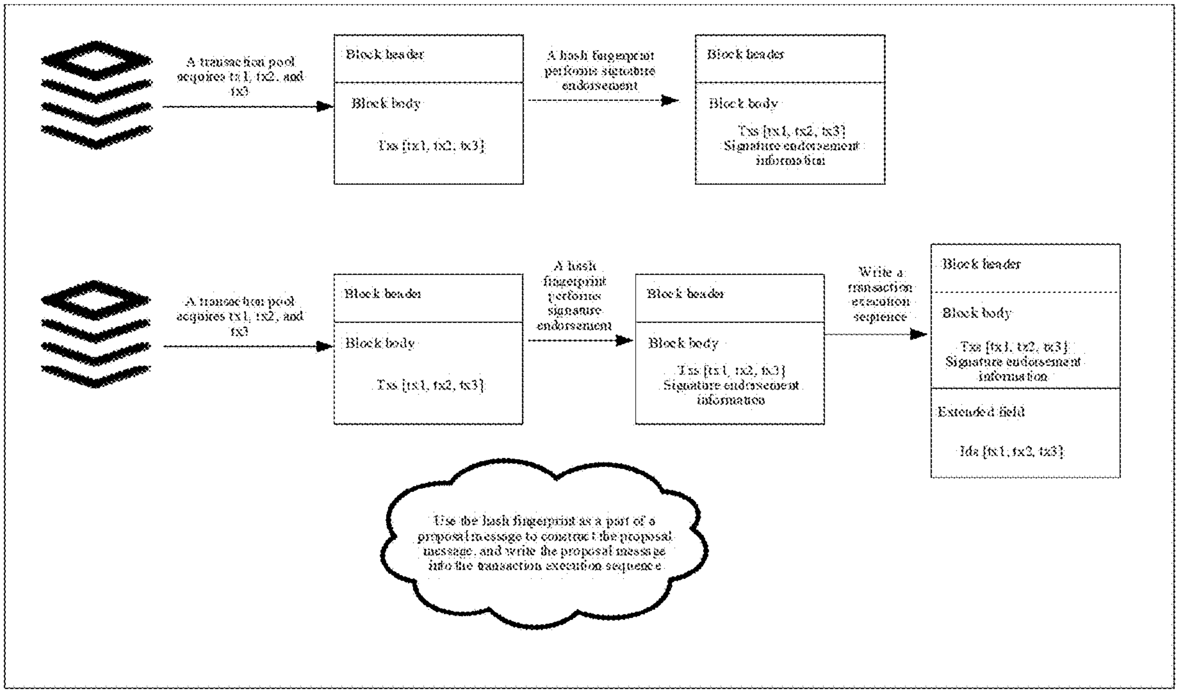
FIG. 9 is a schematic flowchart of generating a proposal message according to an embodiment of the present disclosure.

In a possible implementation, a plurality of pieces of to-be-packaged transaction data exist. In this way, in the process of generating the proposal message, the proposal node may further acquire acquisition time of each piece of to-be-packaged transaction data, sort an execution sequence of a plurality of pieces of transaction data based on the acquisition time of each piece of transaction data, to determine a transaction execution sequence of each piece of transaction data; and package the transaction execution sequence into the proposal message. The transaction execution sequence is configured for triggering any verification node that receives the proposal message to execute each piece of transaction data in the transaction block in a sequence indicated by the transaction execution sequence. Specifically, the proposal node may sequentially sort each piece of transaction data based on the acquisition time of the pieces of transaction data acquired from the transaction pool. FIG. 9 is a schematic flowchart of generating a proposal message according to an embodiment of the present disclosure. As shown in FIG. 9, the proposal node may acquire a plurality of pieces of transaction data: tx1, tx2, and tx3 from the transaction pool, construct a transaction block based on each piece of acquired transaction data, and further determine acquisition time of each piece of transaction data. For example, if acquisition time of the transaction data tx1 is 10:00, acquisition time of the transaction data tx2 is 10:01, and acquisition time of the transaction data tx2 is 10:02, a transaction execution sequence may be tx1> tx2>tx3, to be specific, each node may preferentially execute the transaction data tx1, then execute the transaction data tx2, and finally execute the transaction data tx3. In this manner, when there is a large amount of transaction data, each verification node executes transaction data in a block based on a uniform transaction execution sequence, so that consensus efficiency is improved.

In a possible implementation, the proposal node may further execute each piece of transaction data in the transaction block, to obtain the transaction execution result of each piece of transaction data. Then, when generating the proposal message through combining, the proposal node may write the transaction execution result of each piece of transaction data into the proposal message.

S704: Broadcast the proposal message to at least one verification node in the block chain, to trigger each verification node to reach a consensus, based on the hash fingerprint of the proposal node in the proposal message, on the proposal message.

During specific implementation, the foregoing consensus may include: verifying whether a transaction execution result of the proposal node for each piece of transaction data in the transaction block is consistent with a transaction execution result of the verification node for each piece of transaction data in the transaction block, and verifying whether the proposal message is generated by the proposal node. More specifically, the verification node may check a source of the proposal message (validity of the signature endorsement information: whether the signature endorsement information is signed by a proposal node selected in a current view, for example, the signature endorsement information may be verified based on a public key of the proposal node), then execute each piece of transaction data in the proposal message, to obtain the transaction execution result of each piece of transaction data. The proposal message may further include a transaction execution result of the proposal node. If the transaction execution result of each piece of transaction data is consistent the transaction execution result of the proposal node, the verification node votes for the proposal message, and if the transaction execution result of each piece of transaction data is not consistent the transaction execution result of the proposal node, the verification node votes against the proposal message.

In a possible implementation, after the proposal node broadcasts the proposal message to the at least one verification node in the block chain, the method may further include: receiving a voting message transmitted by each verification node, the voting message being generated after any verification node reaches a consensus on the proposal message; and performing, if it is determined, based on each received voting message, that the proposal message satisfies a consensus condition, block chain chaining on a transaction block corresponding to the proposal message.

The voting message is configured for indicating a consensus result obtained after the verification node reaches a consensus on the transaction block corresponding to the proposal message. The consensus result is a consensus success or a consensus failure. After receiving voting messages transmitted by a plurality of verification nodes, the proposal node acquires a consensus result corresponding to each verification node. If the received consensus result is that a quantity of nodes reaching a consensus is greater than or equal to a preset quantity threshold (2f+1), it is determined that the proposal message satisfies the consensus condition; and if the received consensus result is that a quantity of nodes reaching a consensus is less than a preset quantity threshold (2f+1), it is determined that the proposal message does not satisfy the consensus condition.

Specifically, if it is determined, based on each received voting message, that the proposal message satisfies the consensus condition, the following two transaction operations may be triggered to be performed: ① Each piece of transaction data in the transaction block is deleted from the transaction pool. For example, if the transaction block includes the transaction data tx1, the transaction data tx2, the transaction data tx3, and transaction data tx4, the transaction data tx1, the transaction data tx2, the transaction data tx3, and the transaction data tx4 in the transaction pool are deleted. ② A block height of a transaction block in the block chain is acquired; at least one reference block matching the block height in the block chain is acquired; and each reference transaction included in each acquired reference block is stored into the transaction pool. The same block height corresponds to one or more to-be-added blocks, but one block is finally allowed to be submitted on chain. Therefore, in the present disclosure, another block of a block height corresponding to a to-be-on-chained block (a transaction block of which consensus has succeeded) needs to be pruned, to ensure that the transaction block is submitted to the chaining.

In embodiments of the present disclosure, when the proposal message is constructed, the proposal node first packages to-be-packaged transaction data to obtain a transaction block, then performs signature endorsement on the transaction block based on a hash fingerprint of the proposal node to determine signature endorsement information, and then performs construction based on the signature endorsement information and the transaction block to obtain the proposal message. During a block consensus, after receiving the proposal message transmitted by the proposal node, a verification node may parse the hash fingerprint of the proposal node in the proposal message, and acquire complete certificate data of the proposal node based on the hash fingerprint. Finally, the verification node reaches a consensus on the proposal message based on the acquired complete certificate data. It can be learned that the proposal message constructed during the consensus is generated after the signature endorsement is performed based on the hash fingerprint of the proposal node. Compared with performing signature endorsement based on the complete certificate data of the proposal node, a data amount occupied by the hash fingerprint is smaller, thereby reducing a volume of the proposal message. Further, an amount of data transmission can also be reduced by using a proposal message with a small volume during data transmission, thereby improving consensus efficiency.

Figure 10:
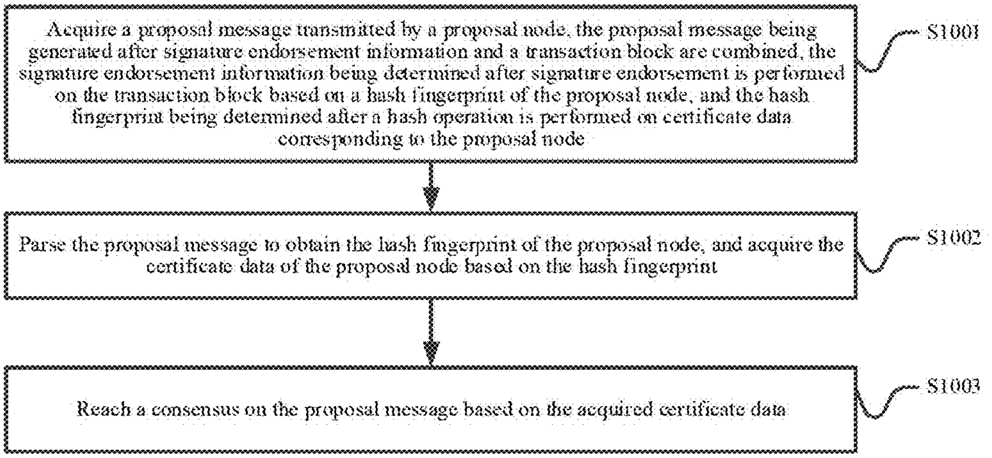
FIG. 10 is a schematic flowchart of another block chain consensus method according to an embodiment of the present disclosure.

FIG. 10 is a schematic flowchart of another block chain consensus method according to an embodiment of the present disclosure. The method is applied to the verification node in the block chain consensus system shown in FIG. 4. The block chain consensus method mainly includes but is not limited to the following operations S1001 to S1003.

S1001: Acquire a proposal message transmitted by a proposal node, the proposal message being generated after signature endorsement information and a transaction block are combined, the signature endorsement information being determined after signature endorsement is performed endorsement on the transaction block based on a hash fingerprint of the proposal node, and the hash fingerprint being determined after a hash operation is performed on certificate data corresponding to the proposal node.

Any verification node in this embodiment of the present disclosure may include a consensus engine and a core engine. Specifically, the proposal message transmitted by the proposal node may be acquired by using the consensus engine, and then the proposal message received by the consensus engine is transmitted to the core engine for reaching a consensus.

In a possible implementation, after receiving the proposal message transmitted by the proposal node, the verification node may further acquire a node identifier of the proposal node; and perform verification on the proposal node based on the node identifier. If the verification succeeds, an operation of parsing the proposal message to obtain the hash fingerprint of the proposal node, and acquiring the certificate data of the proposal node based on the hash fingerprint is triggered to be performed. The verification includes any one or more of security verification and legality verification. In this manner, security verification may be performed on the proposal node in the block chain, thereby improving security and reliability of a block chain consensus.

S1002: Parse the proposal message to obtain the hash fingerprint of the proposal node, and acquire the certificate data of the proposal node based on the hash fingerprint.

During specific implementation, the verification node may perform data parsing on the proposal message, to obtain the signature endorsement information and obtain a hash fingerprint in the signature endorsement information. The data parsing may include data decompression and key field parsing. For example, assuming that the proposal message is obtained through data compression in a preset format, during data decompression, the same format needs to be used for the data decompression. For another example, assuming that the proposal message includes an extended field, key field parsing may be performed on the proposal message to obtain the extended field, so as to acquire a hash fingerprint stored in the extended field. Next, a specific process of acquiring the certificate data of the proposal node based on the hash fingerprint is described in detail.

In a possible implementation, that the verification node acquires the certificate data of the proposal node based on the hash fingerprint may include: Data query is performed from a cache component of the verification node based on the hash fingerprint, and queried data is used as the certificate data of the proposal node; or a contract database of the verification node is queried based on the hash fingerprint if no corresponding data is queried from the cache component of the verification node, to obtain the certificate data of the proposal node. The cache component is configured to store the certificate data queried from the contract database. In one embodiment, if the certificate data is queried from the contract database, the queried certificate data may be further stored into an LRU cache component of a current verification node, to directly query corresponding certificate data from the LRU cache component next time.

Figure 11:
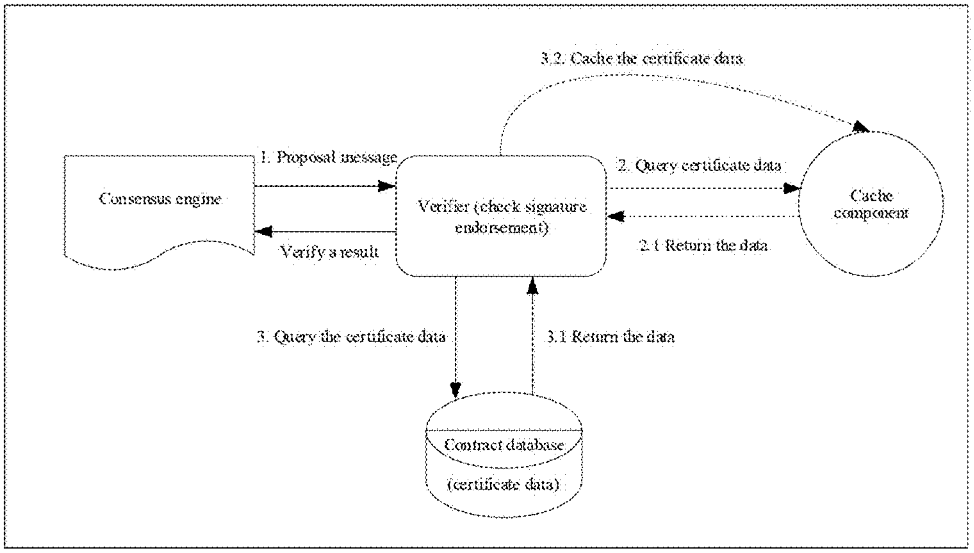
FIG. 11 is a schematic flowchart of querying certificate data according to an embodiment of the present disclosure.

FIG. 11 is a schematic flowchart of querying certificate data according to an embodiment of the present disclosure. During specific implementation, after receiving the proposal message, the verification node preferentially queries a least recently used (LRU) cache component (a cache component for short) in a node internal memory for certificate data of a corresponding proposal node. If the certificate data corresponding to a hash fingerprint is not queried from the LRU cache component, data query is performed in a contract database of the verification node. If the certificate data is queried from the contract database, the queried certificate data may be further stored into the LRU cache component of the current node. When any verification node reaches a consensus on the proposal message for the first time, corresponding complete certificate data needs to be queried from the contract database of the node based on a hash fingerprint of a proposal node x, and then the queried certificate data may be stored into the LRU cache component. In this way, after the proposal message acquired through signature of the hash fingerprint of the proposal node x is received again subsequently, the complete certificate data of the proposal node x may be directly acquired from the LRU cache component without performing data query from the contract database. Because a contract database (a DB database) of any node stores certificate data of another node in a block chain network, a data amount is large, and the LRU cache component usually stores certificate data queried by the node during a consensus, efficiency of querying from the contract database by the verification node is usually lower than efficiency of querying from the LRU cache component. Therefore, an objective for directly acquiring from the LRU cache component is that query time can be reduced, and consensus efficiency can be improved.

In a possible implementation, if no corresponding data is queried from the cache component based on the hash fingerprint and no corresponding data is queried from the contract database based on the hash fingerprint, a voting message indicating that the consensus on the proposal message fails is generated; and the voting message indicating that the consensus fails is transmitted to the proposal node. Specifically, if the corresponding certificate data is not queried from neither the LRU cache component of the node nor the contract database of the node, it may be considered that signature endorsement is invalid, and the verification node determines that consensus verification on the proposal message including the verification node fails, and votes against the proposal message (a voting message indicating that the consensus fails). In one embodiment, if the corresponding certificate data is not queried from neither the LRU cache component of the node nor the contract database of the node, a node identifier of the proposal node may be acquired, and the certificate data is queried, based on the node identifier, from a system contract maintained in the contract database. If no corresponding data is queried, it is considered that signature endorsement is invalid. If the certificate data can be queried, queried corresponding data is used as the certificate data of the proposal node.

In a possible implementation, before acquiring the proposal message transmitted by the proposal node, the verification node may further acquire a to-be-on-chained node proposal transmitted by the proposal node, the to-be-on-chained node proposal including the certificate data of the proposal node; reach a consensus on the node proposal based on the certificate data included in the node proposal, the consensus including any one or more of checking an identity of the proposal node or checking validity and security of transaction data in the node proposal; and generate, if the consensus on the node proposal succeeds, a voting result indicating that the consensus succeeds, and transmit the voting result to the proposal node. During specific implementation, ① checking validity of block data may include checking whether a transaction is legal (whether the transaction includes sensitive and malicious information), and checking whether the transaction has transaction permission (for example, for a transfer transaction, whether an object initiating the transfer has transfer permission may be checked; and for another example, for a data query transaction, whether an object initiating a data query has query permission may be checked). ② Checking the identity of the proposal node may include checking whether a current node proposal is initiated by a specified proposal node, and checking whether signature endorsement information is correct, and the like.

In other words, before performing data query based on the hash fingerprint, the verification node needs to participate in a block chain chaining process of the certificate data of the proposal node (where the block chain chaining process is configured for storing the certificate data of the proposal node into the system contract of the contract database, and for a specific process, reference may be made to a related process in the embodiment of FIG. 7), so that when corresponding certificate data needs to be queried, the certificate data of the proposal node can be queried from the contract database based on a specified hash fingerprint.

S1003: Reach a consensus on the proposal message based on the acquired certificate data.

During specific implementation, the consensus may include verifying whether a transaction execution result of the proposal node for each piece of transaction data in the transaction block is consistent with a transaction execution result of the verification node for each piece of transaction data in the transaction block, and verifying whether the proposal message is generated by the proposal node. Next, the two verification manners are described in detail.

① Verify a Source of the Proposal Message.

In a possible implementation, a process in which the verification node verifies whether the proposal message is generated by the proposal node may include: determining a proposal node associated with the acquired certificate data, and verifying whether the proposal node is consistent with a primary node selected in a current consensus view; and determining, if the proposal node is consistent with the primary node selected in the current consensus view, that the proposal message is generated by the proposal node, and triggering the verification node to perform an operation of verifying each piece of transaction data in the proposal message.

② Verify Whether Transaction Execution Results are Consistent.

In a possible implementation, a process in which the verification node verifies whether the transaction execution results are consistent may include: executing each piece of transaction data included in the transaction block in the proposal message, to obtain a transaction execution result of each piece of transaction data; parsing the proposal message to obtain a transaction execution result of the proposal node for each piece of transaction data in the transaction block; and generating, if the transaction execution result corresponding to the verification node is the same as the transaction execution result of the proposal node, a voting message indicating that the consensus on the proposal message succeeds, and transmitting the voting message to the proposal node. In one embodiment, the proposal message includes a transaction execution sequence. The verification node may parse the transaction execution sequence in the proposal message, sequentially execute each piece of transaction data in the transaction block based on the transaction execution sequence acquired through parsing, obtain a transaction execution result of each piece of transaction data, and finally compare the transaction execution result of each piece of transaction data obtained by the verification node with the transaction execution result of each piece of transaction data corresponding to the proposal node. If the transaction execution result of each piece of transaction data obtained by the verification node is consistent with the transaction execution result of each piece of transaction data corresponding to the proposal node, a consensus on the block data succeeds. In this manner, each piece of transaction data is executed based on the transaction execution sequence of the proposal node for each piece of transaction data, to ensure that a sequence in which the transaction data is executed between nodes is consistent, thereby improving consensus efficiency.

Figure 12:
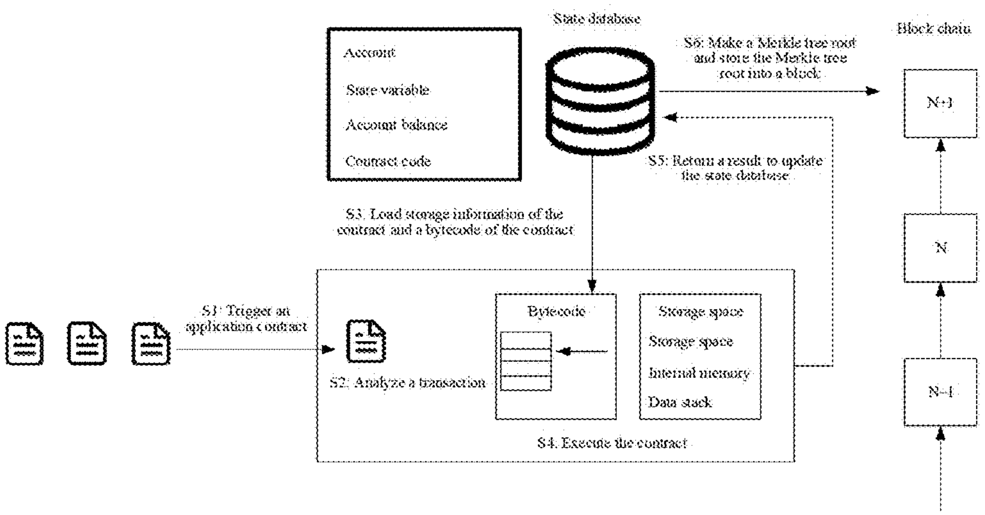
FIG. 12 is a schematic flowchart of executing transaction data according to an embodiment of the present disclosure.

Specifically, each piece of transaction data in the transaction block may be executed by calling a smart contract. As an example, FIG. 12 is a schematic flowchart of executing transaction data according to an embodiment of the present disclosure. As shown in FIG. 12, the process of executing the transaction data includes the following operations S1 to S6.

S1: Trigger a contract.

During specific implementation, a verification node may acquire a contract address of the smart contract based on a transaction type of the transaction data, and trigger to call a corresponding smart contract based on the contract address.

S2: Parse the transaction data.

During specific implementation, the verification node parses the transaction data to obtain a contract calling address and a contract name, and acquires a smart contract (for example, including information such as a contract name, a contract method, and contract input) configured for executing a corresponding service request.

S3: Load storage information of the contract and bytecode of the contract.

During specific implementation, the verification node acquires corresponding contract bytecode and contract input from the transaction data and a state database.

S4: Execute the contract.

During specific implementation, contract code is executed in the verification node, to complete service logic indicated by corresponding transaction data, for example, service logic such as digital resource transfer logic, invoicing logic, and game logic.

S5: Return a result updating state database.

During specific implementation, the verification node writes back a transaction execution result corresponding to the transaction data to the state database, to complete updating of a service state.

S6: Make a Merkle tree root, and store the Merkle tree root in a block.

In a possible implementation, after reaching a consensus on the proposal message based on the acquired certificate data, the verification node may further receive a voting confirmation message (which may include a qc data set formed by voting messages of verification nodes) transmitted by the proposal node. The voting confirmation message means that after receiving 2f+1 agreement votes, the proposal node may confirm that a current proposal message reaches a consensus in most consensus nodes, to generate a voting confirmation message indicating that the consensus succeeds. The voting confirmation message is used by each verification nodes to also learn that the current proposal message reaches a consensus in the most nodes. In other words, a next consensus phase can be entered.

In embodiments of the present disclosure, during a block consensus, after receiving the proposal message transmitted by the proposal node, the verification node may parse the hash fingerprint of the proposal node in the proposal message, and acquire complete certificate data of the proposal node based on the hash fingerprint. Finally, the verification node reaches a consensus on the proposal message based on the acquired complete certificate data. In the present disclosure, the certificate data acquired from the system contract may be recorded in a node internal memory by using an LRU cache. When the proposal message using the hash fingerprint as signature endorsement is verified, query is first performed on the LRU cache component in an internal memory by using the hash fingerprint. If the certificate data does not exist, system contract data in a DB database is queried. This manner can reduce a quantity of times of querying the contract data in the DB database when the signature endorsement of the proposal message is verified, so that data query efficiency is improved.

Figure 13:
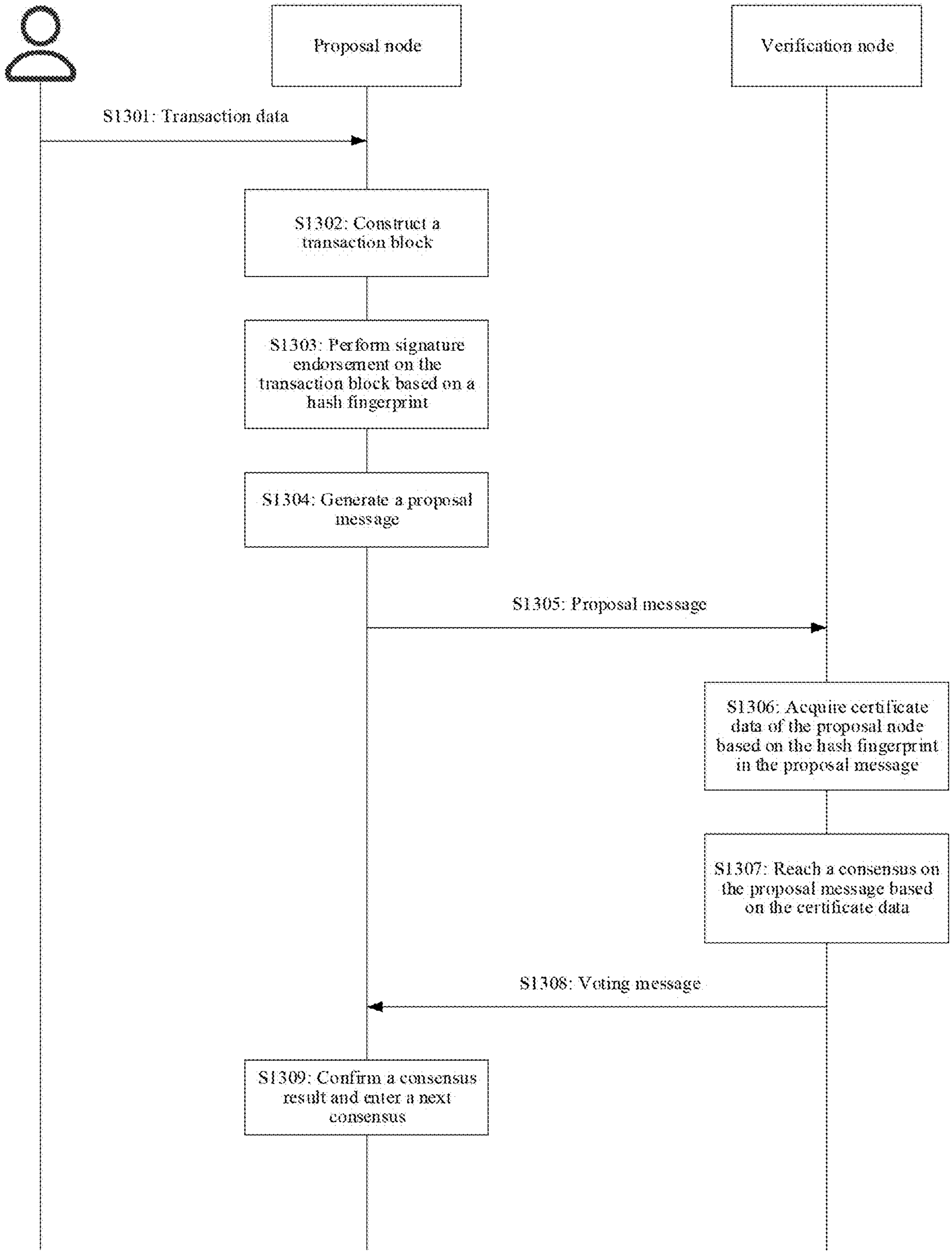
FIG. 13 is an interaction flowchart of a block chain consensus method according to an embodiment of the present disclosure.

FIG. 13 is an interaction flowchart of a block chain consensus method according to an embodiment of the present disclosure. The interaction process is applied to the proposal node and the verification node in the block chain consensus system shown in FIG. 4. The interaction process of the block chain consensus method mainly includes, but is not limited to, the following operations S1301 to S1309.

S1301: The proposal node receives transaction data transmitted by a user client.

During specific implementation, the transaction data may be transaction data initiated by the user client in real time, or the transaction data may be transaction data acquired from a transaction pool.

S1302: The proposal node constructs a transaction block.

During specific implementation, there may be one or more pieces of transaction data acquired by the proposal node, and the proposal node may add each piece of acquired transaction data to a block body of the transaction block. In one embodiment, in a process of constructing the transaction block, the proposal node may sequentially store pieces of transaction data into the transaction block based on acquisition time of the pieces of the transaction data. For example, time of acquiring transaction data tx1 is 10:00, time of acquiring transaction data tx2 is 10:01, and time of acquiring transaction data tx3 is 10:02, therefore, the transaction data tx1 may be added to the transaction block first, then, the transaction data tx2 is added to the transaction block, and finally the transaction data tx3 is added to the transaction block. In one embodiment, in a process of constructing the transaction block, the proposal node may further sequentially store pieces of transaction data into the transaction block based on each data amount of each piece of transaction data. For example, a data amount of transaction data tx1 is data1, a data amount of transaction data tx2 is data2, a data amount of transaction data tx3 is data3, and data1>data2>data3, therefore, the transaction data tx3 may be added to the transaction block first, then, the transaction data tx2 is added to the transaction block, and finally the transaction data tx1 is added to the transaction block.

S1303: The proposal node performs signature endorsement on the transaction block based on a hash fingerprint.

During specific implementation, the hash fingerprint may include a hash fingerprint of a node certificate or a hash fingerprint of a node public key. The hash fingerprint of the node certificate is data obtained after a hash operation is performed on the node certificate, and the hash fingerprint of the node public key is data obtained after a hash operation is performed on the node public key. After signature endorsement is performed on the transaction block based on the hash fingerprint of the proposal node, signature endorsement information may be obtained.

S1304: The proposal node generates a proposal message.

During specific implementation, the proposal node may combine the signature endorsement information and the transaction block, to obtain the proposal message. In one embodiment, a specific process in which the proposal node generates the proposal message may include: For example, the signature endorsement information and the transaction block may be compressed, and the compressed signature endorsement information and transaction block are packaged, to obtain the proposal message. For another example, the signature endorsement information may be added to the block body of the transaction block, to obtain the proposal message through construction. For another example, an extended field may be created for the transaction block, and then the signature endorsement information is added to the extended field of the transaction block, to generate the proposal message.

S1305: The proposal node broadcasts the proposal message to the verification node.

In a possible implementation, the proposal node may transmit the proposal message to some or all verification nodes, to trigger each verification node to reach a consensus on the proposal message based on the hash fingerprint of the proposal node in the proposal message.

S1306: The verification node acquires certificate data of the proposal node based on the hash fingerprint in the proposal message.

During specific implementation, the verification node may parse the proposal message to obtain the hash fingerprint in the proposal message, and then acquire the certificate data of the proposal node based on the hash fingerprint obtained through parsing. More specifically, that the verification node acquires the certificate data of the proposal node based on the hash fingerprint in the proposal message may include: Data query is performed from a cache component of the verification node based on the hash fingerprint, and queried data is used as the certificate data of the proposal node; or a contract database of the verification node is queried based on the hash fingerprint if no corresponding data is queried from the cache component of the verification node, to obtain the certificate data of the proposal node. The cache component is configured to store the certificate data queried from the contract database. In one embodiment, if the certificate data is queried from the contract database, the queried certificate data may be further stored into an LRU cache component of a current verification node, to directly query corresponding certificate data from the LRU cache component next time.

S1307: The verification node reaches a consensus on the proposal message based on the certificate data.

During specific implementation, the consensus may include verifying whether a transaction execution result of the proposal node for each piece of transaction data in the transaction block is consistent with a transaction execution result of the verification node for each piece of transaction data in the transaction block, and verifying whether the proposal message is generated by the proposal node. For details of the process in which the verification node reaches a consensus on the proposal message, reference may be made to the specific process performed in operation S1003 in the embodiment of FIG. 10. Details are not described herein again in this embodiment of the present disclosure.

S1308: The verification node transmits a voting message to the proposal node.

During specific implementation, after reaching a consensus on the proposal message, the verification node may generate the voting message. The voting message is configured for indicating a voting result for the proposal message. For example, the voting result may include an agreement vote or a disagreement vote. In one embodiment, the verification node may perform signature on the voting message, and then transmit a signed voting message to the proposal node.

S1309: The proposal node determines a consensus result and a next round consensus is entered.

During specific implementation, after receiving a voting message from each verification node, the proposal node determines a consensus result of the proposal message based on each received voting message. If a quantity of received agreement votes is greater than or equal to 2f+1, it may be determined that the consensus result indicates that the consensus succeeds, and may trigger to enter a next round consensus. If a quantity of received agreement votes is less than 2f+1, it may be determined that the consensus result indicates that the consensus does not reaches. In addition, if it is determined that the consensus on the proposal message succeeds, block chain chaining may be further performed on the transaction block.

In embodiments of the present disclosure, when the proposal message is constructed, the proposal node first packages to-be-packaged transaction data to obtain a transaction block, then performs signature endorsement on the transaction block based on a hash fingerprint of the proposal node to determine signature endorsement information, and then performs construction based on the signature endorsement information and the transaction block to obtain the proposal message. During a block consensus, after receiving the proposal message transmitted by the proposal node, a verification node may parse the hash fingerprint of the proposal node in the proposal message, and acquire complete certificate data of the proposal node based on the hash fingerprint. Finally, the verification node reaches a consensus on the proposal message based on the acquired complete certificate data. When constructing the proposal message, the proposal node performs signature endorsement based on the hash fingerprint, so that a volume of the proposal message can be reduced, and an amount of message transmission between networks can be reduced, thereby improving consensus efficiency. In addition, in a weak network environment, because an amount of message transmission is reduced, transmission efficiency and an arrival rate of the proposal message can be improved. The rapid and stable transmission of the proposal message accelerates reaching of a consensus between nodes, thereby further improving consensus efficiency.

The method in embodiments of the present disclosure is described in detail above. Correspondingly, an apparatus in embodiments of the present disclosure is provided below to better implement the foregoing solutions in embodiments of the present disclosure. Next, with reference to the block chain consensus solution provided in the foregoing embodiments of the present disclosure, a relevant apparatus in embodiments of the present disclosure is described accordingly.

Figure 14:
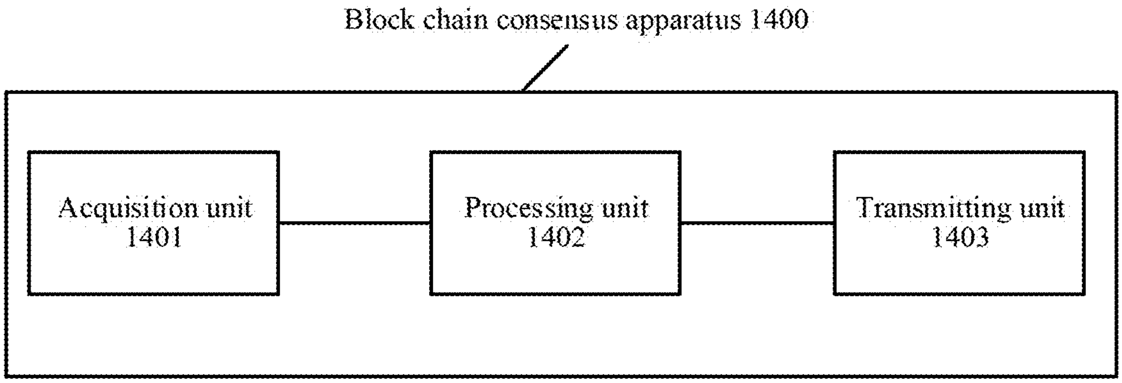
FIG. 14 is a schematic diagram of a structure of a block chain consensus apparatus according to an embodiment of the present disclosure.

FIG. 14 is a schematic diagram of a structure of a block chain consensus apparatus according to an embodiment of the present disclosure. As shown in FIG. 14, the block chain consensus apparatus 1400 may be used in the proposal node (which may be, for example, a terminal device or a server) mentioned in the foregoing embodiments. Specifically, the block chain consensus apparatus 1400 may be a computer-readable instruction (including program code) running in a computer device. For example, the block chain consensus apparatus 1400 is application software. The block chain consensus apparatus 1400 may be configured to perform corresponding operations in the identity verification method based on the block chain according to embodiments of the present disclosure. The block chain consensus apparatus 1400 may specifically include:

an acquisition unit 1401, configured to acquire a to-be-consensual transaction block, the to-be-consensual transaction block being generated based on at least one piece of to-be-packaged transaction data;

a processing unit 1402, configured to: acquire a hash fingerprint of a proposal node, and perform signature endorsement on the transaction block by using the hash fingerprint of the proposal node, to obtain signature endorsement information, the hash fingerprint being determined after a hash operation is performed on certificate data corresponding to the proposal node, and the processing unit 1402 being further configured to combine the signature endorsement information and the transaction block, to generate a proposal message; and a transmitting unit 1403, configured to broadcast the proposal message to at least one verification node in the block chain, to trigger each verification node to reach a consensus, based on the hash fingerprint of the proposal node in the proposal message, on the proposal message.

In a possible implementation, the processing unit 1402 is further configured to: receive contract calling transaction data transmitted by an operation node, the contract calling transaction data including: a contract identifier of a system contract; perform signature endorsement on a packaged transaction block based on certificate data of the proposal node, to generate a to-be-on-chained node proposal, the packaged transaction block including the contract calling transaction data; and perform block chain chaining on the certificate data of the proposal node based on the contract identifier of the system contract if it is determined that a block chain consensus on the node proposal succeeds, the contract identifier being configured for indicating the proposal node and any verification node to store certificate data of the proposal node into respective contract databases, and the contract database maintaining the system contract indicated by the contract identifier.

In a possible implementation, after performing the signature endorsement on the packaged transaction block based on the certificate data of the proposal node, to generate a to-be-on-chained node proposal, the processing unit 1402 is further configured to: broadcast the to-be-on-chained node proposal to at least one verification node in the block chain, to trigger each verification node to perform block chain chaining on the certificate data corresponding to the proposal node; receive a voting result transmitted by each verification node, the voting result being generated after any verification node reaches a consensus on the to-be-on-chained node proposal; and acquire a hash fingerprint of the certificate data of the proposal node, and associate and store the certificate data and the hash fingerprint of the proposal node into the contract database of the proposal node, if it is determined, based on each received voting result, that a block chain consensus on the node proposal succeeds.

In a possible implementation, the processing unit 1402 performs the block chain chaining on the certificate data of the proposal node based on the contract identifier of the system contract, and is configured to: generate, if it is determined, based on each received voting result, that the consensus on the node proposal succeeds, a notification message indicating that the consensus on the node proposal succeeds, the notification message carrying the contract identifier of the system contract; and transmit the notification message to each verification node in the block chain, the notification message being configured for triggering any verification node to store the certificate data of the proposal node into a contract database corresponding to the verification node, a system contract maintained in a contract database of any verification node recording: the hash fingerprint and the certificate data associated and stored for the proposal node.

In a possible implementation, after broadcasting the proposal message to the at least one verification node in the block chain, the processing unit 1402 is further configured to: receive a voting message transmitted by each verification node, the voting message being generated after any verification node reaches a consensus on the proposal message; and perform, if it is determined, based on each received voting message, that the proposal message satisfies a consensus condition, block chain chaining on a transaction block corresponding to the proposal message, the consensus reached by any verification node including: verifying whether a transaction execution result of the proposal node for each piece of transaction data in the transaction block is consistent with a transaction execution result of the verification node for each piece of transaction data in the transaction block, and verifying whether the proposal message is generated by the proposal node.

In a possible implementation, a plurality of pieces of to-be-packaged transaction data exist. The processing unit 1402 is further configured to: acquire acquisition time of each piece of to-be-packaged transaction data, and sort an execution sequence of the plurality of pieces of transaction data based on the acquisition time of each piece of transaction data, to determine a transaction execution sequence of each piece of transaction data; and package the transaction execution sequence into the proposal message, the transaction execution sequence being configured for triggering any verification node that receives the proposal message to execute each piece of transaction data in the transaction block in a sequence indicated by the transaction execution sequence.

In embodiments of the present disclosure, when the proposal message is constructed, the proposal node first packages to-be-packaged transaction data to obtain a transaction block, then performs signature endorsement on the transaction block based on a hash fingerprint of the proposal node to determine signature endorsement information, and then performs construction based on the signature endorsement information and the transaction block to obtain the proposal message. During a block consensus, after receiving the proposal message transmitted by the proposal node, a verification node may parse the hash fingerprint of the proposal node in the proposal message, and acquire complete certificate data of the proposal node based on the hash fingerprint. Finally, the verification node reaches a consensus on the proposal message based on the acquired complete certificate data. It can be learned that the proposal message constructed during the consensus is generated after the signature endorsement is performed based on the hash fingerprint of the proposal node. Compared with performing signature endorsement based on the complete certificate data of the proposal node, a data amount occupied by the hash fingerprint is smaller, thereby reducing a volume of the proposal message. Further, an amount of data transmission can also be reduced by using a proposal message with a small volume during data transmission, thereby improving consensus efficiency.

Figure 15:
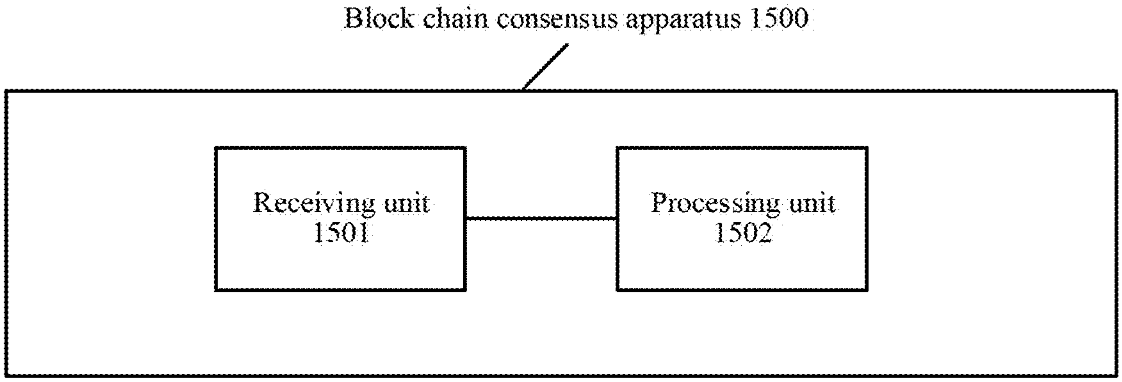
FIG. 15 is a schematic diagram of a structure of another block chain consensus apparatus according to an embodiment of the present disclosure.

FIG. 15 is a schematic diagram of a structure of another block chain consensus apparatus according to an embodiment of the present disclosure. As shown in FIG. 15, the block chain consensus apparatus 1500 may be used in the verification node (which may be, for example, a terminal device or a server) mentioned in the foregoing embodiments. Specifically, the block chain consensus apparatus 1500 may be a computer-readable instruction (including program code) running in a computer device. For example, the block chain consensus apparatus 1500 is application software. The block chain consensus apparatus 1500 may be configured to perform corresponding operations in the identity verification method based on the block chain according to embodiments of the present disclosure. The block chain consensus apparatus 1500 may specifically include:

- a receiving unit 1501, configured to receive a proposal message transmitted by a proposal node, the proposal message being generated after signature endorsement information and a transaction block are combined, the signature endorsement information being determined after signature endorsement is performed on the transaction block based on a hash fingerprint of the proposal node, and the hash fingerprint being determined after a hash operation is performed on certificate data corresponding to the proposal node; and
- a processing unit 1502, configured to parse the proposal message to obtain the hash fingerprint of the proposal node, and acquire the certificate data of the proposal node based on the hash fingerprint, and
- the processing unit 1502 being further configured to reach a consensus on the proposal message based on the acquired certificate data.

In a possible implementation, the processing unit 1502 acquires the certificate data of the proposal node based on the hash fingerprint, and is configured to: perform data query from a cache component of the verification node based on the hash fingerprint, and use queried data as the certificate data of the proposal node; or query, if no corresponding data is queried from the cache component of the verification node, the contract database of the verification node based on the hash fingerprint, to obtain the certificate data of the proposal node, the cache component being configured to store the certificate data queried from the contract database.

In a possible implementation, the processing unit 1502 is further configured to: generate, if no corresponding data is queried from the cache component based on the hash fingerprint and no corresponding data is queried from the contract database based on the hash fingerprint, a voting message indicating that the consensus on the proposal message fails; and transmit the voting message indicating that the consensus fails to the proposal node.

In a possible implementation, the processing unit 1502 reaches a consensus on the proposal message based on the acquired certificate data, and is configured to: determine a proposal node associated with the acquired certificate data, and verify whether the proposal node is consistent with a primary node selected in a current consensus view; and trigger the verification node to perform an operation of verifying each piece of transaction data in the proposal message, when the proposal node is consistent with the primary node selected in the current consensus view.

In a possible implementation, the processing unit 1502 is further configured to: execute each piece of transaction data included in the transaction block in the proposal message, to obtain a transaction execution result of each piece of transaction data; parse the proposal message to obtain a transaction execution result of the proposal node for each piece of transaction data in the transaction block; and generate, if the transaction execution result corresponding to the verification node is the same as the transaction execution result of the proposal node, a voting message indicating that the consensus on the proposal message succeeds, and transmit the voting message to the proposal node.

In a possible implementation, the processing unit 1502 is further configured to: acquire a to-be-on-chained node proposal transmitted by the proposal node, the to-be-on-chained node proposal including the certificate data of the proposal node; reach a consensus on the node proposal based on the certificate data included in the node proposal, the consensus including: any one or more of checking an identity of the proposal node or checking validity and security of transaction data in the node proposal; and generate, if the consensus on the node proposal succeeds, a voting result indicating that the consensus succeeds, and transmit the voting result to the proposal node.

In embodiments of the present disclosure, during a block consensus, after receiving the proposal message transmitted by the proposal node, the verification node may parse the hash fingerprint of the proposal node in the proposal message, and acquire complete certificate data of the proposal node based on the hash fingerprint. Finally, the verification node reaches a consensus on the proposal message based on the acquired complete certificate data. In the present disclosure, the certificate data acquired from the system contract may be recorded in a node internal memory by using an LRU cache. When the proposal message using the hash fingerprint as signature endorsement is verified, query is first performed on the LRU cache component in an internal memory by using the hash fingerprint. If the certificate data does not exist, system contract data in a DB database is queried. This manner can reduce a quantity of times of querying the contract data in the DB database when the signature endorsement of the proposal message is verified, so that data query efficiency is improved.

Figure 16:
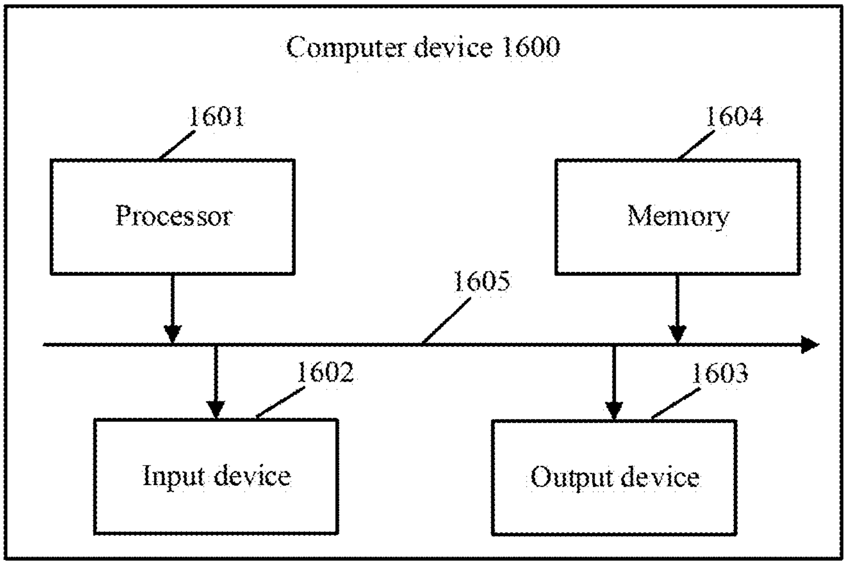
FIG. 16 is a schematic diagram of a structure of a computer device according to an embodiment of the present disclosure.

FIG. 16 is a schematic diagram of a structure of a computer device according to an embodiment of the present disclosure. The computer device 1600 is configured to perform the operations performed by the proposal node and the verification node in the foregoing method embodiments. The computer device 1600 includes: one or more processors 1601; one or more input devices 1602; one or more output devices 1603; and a memory 1604. The processor 1601, the input device 1602, the output device 1603, and the memory 1604 are connected through a bus 1605. The processor 1601 (or referred to as a central processing unit, (CPU)) is a processing core of the computer device, and the processor 1601 is configured to implement one or more computer-readable instructions, and is specifically configured to load and execute the one or more computer-readable instructions, to implement the process of the foregoing block chain consensus method. In addition, the memory 1604 may be a high-speed RAM memory, or may be a non-volatile memory, for example, at least one magnetic disk memory. In some embodiments, the memory 1604 may be at least one memory that is far away from the foregoing processor. The memory 1604 provides storage space for storing an operating system of a content playback device. In addition, the storage space is further for storing computer-readable instructions. The computer-readable instructions are configured to be invoked and executed by the processor to perform the operations of the block chain consensus method in the present disclosure.

Specifically, the memory 1604 is configured to store computer-readable instructions, and the processor 1601 invokes the computer-readable instructions stored in the memory 1604 to perform the following operations:

- acquiring a to-be-consensual transaction block, the to-be-consensual transaction block being generated based on at least one piece of to-be-packaged transaction data;
- acquiring a hash fingerprint of the proposal node, and performing signature endorsement on the transaction block by using the hash fingerprint of the proposal node, to obtain signature endorsement information, the hash fingerprint being determined after a hash operation is performed on certificate data corresponding to the proposal node;
- combining the signature endorsement information and the transaction block, to generate a proposal message; and
- broadcasting the proposal message to at least one verification node in the block chain, to trigger each verification node to reach a consensus, based on the hash fingerprint of the proposal node in the proposal message, on the proposal message.

In a possible implementation, the processor 1601 is further configured to perform the following operations:

- receiving contract calling transaction data transmitted by an operation node, the contract calling transaction data including: a contract identifier of a system contract;
- performing signature endorsement on a packaged transaction block based on certificate data of the proposal node, to generate a to-be-on-chained node proposal, the packaged transaction block including the contract calling transaction data; and
- performing block chain chaining on the certificate data of the proposal node based on the contract identifier of the system contract if it is determined that a block chain consensus on the node proposal succeeds,
- the contract identifier being configured for indicating the proposal node and any verification node to store certificate data of the proposal node into respective contract databases, and the contract database maintaining the system contract indicated by the contract identifier.

In a possible implementation, after performing the signature endorsement on the packaged transaction block based on the certificate data of the proposal node, to generate a to-be-on-chained node proposal, the processor 1601 is further configured to perform the following operations:

- broadcasting the to-be-on-chained node proposal to at least one verification node in the block chain, to trigger each verification node to perform block chain chaining on the certificate data corresponding to the proposal node;
- receiving a voting result transmitted by each verification node, the voting result being generated after any verification node reaches a consensus on the to-be-on-chained node proposal; and
- acquiring a hash fingerprint of the certificate data of the proposal node, and associating and storing the certificate data and the hash fingerprint of the proposal node into the contract database of the proposal node, if it is determined, based on each received voting result, that a block chain consensus on the node proposal succeeds.

In a possible implementation, the processor 1601 performs the block chain chaining on the certificate data of the proposal node based on the contract identifier of the system contract, to perform the following operations:

- generating, if it is determined, based on each received voting result, that the consensus on the node proposal succeeds, a notification message indicating that the consensus on the node proposal succeeds, the notification message carrying the contract identifier of the system contract; and
- transmitting the notification message to each verification node in the block chain, the notification message being configured for triggering any verification node to store the certificate data of the proposal node into a contract database corresponding to the verification node,
- a system contract maintained in a contract database of any verification node recording: the hash fingerprint and the certificate data associated and stored for the proposal node.

In a possible implementation, after broadcasting the proposal message to the at least one verification node in the block chain, the processor 1601 is further configured to perform the following operations:

- receiving a voting message transmitted by each verification node, the voting message being generated after any verification node reaches a consensus on the proposal message; and
- performing, if it is determined, based on each received voting message, that the proposal message satisfies a consensus condition, block chain chaining on a transaction block corresponding to the proposal message,
- the consensus reached by any verification node including: verifying whether a transaction execution result of the proposal node for each piece of transaction data in the transaction block is consistent with a transaction execution result of the verification node for each piece of transaction data in the transaction block, and verifying whether the proposal message is generated by the proposal node.

In a possible implementation, a plurality of pieces of to-be-packaged transaction data exist. The processor 1601 is further configured to perform the following operations:

- acquiring acquisition time of each piece of to-be-packaged transaction data, and sorting an execution sequence of the plurality of pieces of transaction data based on the acquisition time of each piece of transaction data, to determine a transaction execution sequence of each piece of transaction data; and packaging the transaction execution sequence into the proposal message, the transaction execution sequence being configured for triggering any verification node that receives the proposal message to execute each piece of transaction data in the transaction block in a sequence indicated by the transaction execution sequence.

Specifically, the memory 1604 is configured to store computer-readable instructions, the processor 1601 invokes the computer-readable instructions stored in the memory 1604, and is further configured to perform the following operations:

receiving a proposal message transmitted by a proposal node, the proposal message being generated after signature endorsement information and a transaction block are combined, the signature endorsement information being determined after signature endorsement is performed on the transaction block based on a hash fingerprint of the proposal node, and the hash fingerprint being determined after a hash operation is performed on certificate data corresponding to the proposal node;

parsing the proposal message to obtain the hash fingerprint of the proposal node, and acquiring the certificate data of the proposal node based on the hash fingerprint; and reaching a consensus on the proposal message based on the acquired certificate data.

In a possible implementation, the processor 1601 acquires the certificate data of the proposal node based on the hash fingerprint, and is configured to perform the following operations:

performing data query from a cache component of the verification node based on the hash fingerprint, and using queried data as the certificate data of the proposal node; or querying, if no corresponding data is queried from the cache component of the verification node, the contract database of the verification node based on the hash fingerprint, to obtain the certificate data of the proposal node, the cache component being configured to store the certificate data queried from the contract database.

In a possible implementation, the processor 1601 is further configured to perform the following operations:

generating, if no corresponding data is queried from the cache component based on the hash fingerprint and no corresponding data is queried from the contract database based on the hash fingerprint, a voting message indicating that the consensus on the proposal message fails; and transmitting the voting message indicating that the consensus fails to the proposal node.

In a possible implementation, the processor 1601 reaches a consensus on the proposal message based on the acquired certificate data, to perform the following operations:

determining a proposal node associated with the acquired certificate data, and verifying whether the proposal node is consistent with a primary node selected in a current consensus view; and triggering the verification node to perform an operation of verifying each piece of transaction data in the proposal message, when the proposal node is consistent with the primary node selected in the current consensus view.

In a possible implementation, the processor 1601 is further configured to perform the following operations:

executing each piece of transaction data included in the transaction block in the proposal message, to obtain a transaction execution result of each piece of transaction data;

parsing the proposal message to obtain a transaction execution result of the proposal node for each piece of transaction data in the transaction block; and generating, if the transaction execution result corresponding to the verification node is the same as the transaction execution result of the proposal node, a voting message indicating that the consensus on the proposal message succeeds, and transmitting the voting message to the proposal node.

In a possible implementation, the processor 1601 is further configured to perform the following operations:

acquiring a to-be-on-chained node proposal transmitted by the proposal node, the to-be-on-chained node proposal including the certificate data of the proposal node;

reaching a consensus on the node proposal based on the certificate data included in the node proposal, the consensus including: any one or more of checking an identity of the proposal node or checking validity and security of transaction data in the node proposal; and generating, if the consensus on the node proposal succeeds, a voting result indicating that the consensus succeeds, and transmitting the voting result to the proposal node.

It can be learned that the proposal message constructed during the consensus is generated after the signature endorsement is performed based on the hash fingerprint of the proposal node. Compared with performing signature endorsement based on the complete certificate data of the proposal node, a data amount occupied by the hash fingerprint is smaller, thereby reducing a volume of the proposal message. Further, an amount of data transmission can also be reduced by using a proposal message with a small volume during data transmission, thereby improving consensus efficiency. In addition, rapid and stable transmission of the proposal message can accelerate a consensus between nodes, further improving consensus efficiency.

In addition, an embodiment of the present disclosure further provides a computer storage medium. The computer storage medium has computer-readable instructions stored therein, the computer-readable instructions include the computer-readable instructions, and when the computer-readable instructions are executed by a processor, the method in the foregoing corresponding embodiments can be implemented. Therefore, details are not described herein again. For technical details that are not disclosed in the computer storage medium embodiment of the present disclosure, reference may be made to the descriptions of the method embodiments of the present disclosure. As an example, the computer-readable instructions may be deployed to be executed on a computer device, or deployed to be executed on a plurality of computer devices at the same location, or deployed to be executed on a plurality of computer devices that are distributed in a plurality of locations and interconnected over a communication network.

According to an aspect of the present disclosure, a computer program product is provided. The computer program product includes computer-readable instructions, and the computer-readable instructions are stored in a computer-readable storage medium. A processor of the computer device reads the computer-readable instructions from the computer-readable storage medium, and the processor executes the computer-readable instructions, so that the computer device performs the method in the foregoing embodiments. Therefore, details are not described herein again.

A person of ordinary skill in the art may understand that all or some procedures in the method in the foregoing embodiments may be implemented by a computer program instructing relevant hardware. The program may be stored in a computer-readable storage medium. When the program is executed, the procedures of the foregoing method embodiments may be included. The foregoing storage medium may be a magnetic disc, an optical disc, a read-only memory (ROM), a random access memory (RAM), or the like.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the present disclosure, which are described specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A block chain consensus method, performed by a computer device in which a proposal node in a block chain is located, comprising:

acquiring a to-be-consensual transaction block, the to-be-consensual transaction block being generated based on one or more pieces of to-be-packaged transaction data;

acquiring a hash fingerprint of the proposal node, and performing a signature endorsement on the transaction block by using the hash fingerprint of the proposal node, to obtain signature endorsement information, the hash fingerprint being determined after a hash operation is performed on certificate data corresponding to the proposal node;

combining the signature endorsement information and the transaction block, to generate a proposal message; and broadcasting the proposal message to at least one verification node in the block chain, to trigger each verification node of the at least one verification node to reach a consensus on the proposal message based on the hash fingerprint of the proposal node in the proposal message.

2. The method according to claim 1, further comprising:

receiving contract calling transaction data transmitted by an operation node, the contract calling transaction data comprising a contract identifier of a system contract;

performing signature endorsement on a packaged transaction block based on the certificate data of the proposal node, to generate a to-be-on-chained node proposal, the packaged transaction block comprising the contract calling transaction data; and performing block chain chaining on the certificate data of the proposal node based on the contract identifier of the system contract if it is determined that a block chain consensus on the node proposal succeeds, the contract identifier being configured for indicating to the proposal node and a verification node to store the certificate data of the proposal node into respective contract databases, and the contract database maintaining the system contract indicated by the contract identifier.

3. The method according to claim 2, further comprising:

broadcasting the to-be-on-chained node proposal to the at least one verification node in the block chain to trigger each verification node to perform block chain chaining on the certificate data corresponding to the proposal node;

receiving a voting result transmitted by each verification node, the voting result being generated after the verification node reaches a consensus on the to-be-on-chained node proposal; and acquiring a hash fingerprint of the certificate data of the proposal node, and associating and storing the certificate data and the hash fingerprint of the proposal node into the contract database of the proposal node, if it is determined, based on each received voting result, that a block chain consensus on the node proposal succeeds.

4. The method according to claim 3, wherein performing block chain chaining on the certificate data corresponding to the proposal node comprises:

generating, if it is determined, based on each received voting result, that the consensus on the node proposal succeeds, a notification message indicating that the consensus on the node proposal succeeds, the notification message carrying the contract identifier of the system contract; and transmitting the notification message to each verification node in the block chain, the notification message being configured for triggering a verification node to store the certificate data of the proposal node into a contract database corresponding to the verification node, wherein a system contract maintained in the contract database corresponding to the verification node recording comprises a hash fingerprint and the certificate data associated and stored for the proposal node.

5. The method of claim 1 further comprising:

receiving a voting message transmitted by a verification node, the voting message being generated after the verification node reaches a consensus on the proposal message, and reaching the consensus on the proposal message comprising:

verifying that a transaction execution result of the proposal node for each piece of transaction data in the transaction block is consistent with a transaction execution result of the verification node for each piece of transaction data in the transaction block; and verifying that the proposal message is generated by the proposal node; and performing, if the verification node reaches a consensus on the proposal message based on the voting message, block chain chaining on a transaction block corresponding to the proposal message.

6. The method of claim 1 further comprising:

acquiring acquisition time of each piece of the one or more pieces of to-be-packaged transaction data, and sorting an execution sequence of the one or more pieces of transaction data based on the acquisition time of each piece of transaction data, to determine a transaction execution sequence of each piece of transaction data; and packaging the transaction execution sequence into the proposal message, the transaction execution sequence being configured for triggering a verification node that receives the proposal message to execute each piece of transaction data in the transaction block in a sequence indicated by the transaction execution sequence.

7. A block chain consensus method, performed by a computer device in which a verification node in a block chain is located, comprising:

receiving a proposal message transmitted by a proposal node, the proposal message being generated after signature endorsement information and a transaction block are combined, the signature endorsement information being determined after a signature endorsement is performed on the transaction block based on a hash fingerprint of the proposal node, and the hash fingerprint being determined after a hash operation is performed on certificate data corresponding to the proposal node;

parsing the proposal message to obtain the hash fingerprint of the proposal node, and acquiring the certificate data of the proposal node based on the hash fingerprint; and reaching a consensus on the proposal message based on the acquired certificate data.

8. The method according to claim 7, wherein acquiring the certificate data of the proposal node based on the hash fingerprint comprises:

performing data query from a cache component of the verification node based on the hash fingerprint, and using queried data as the certificate data of the proposal node, the cache component being configured to store the certificate data queried from a contract database; or querying, if no corresponding data is queried from the cache component of the verification node based on the hash fingerprint, the contract database of the verification node based on the hash fingerprint, to obtain the certificate data of the proposal node, wherein the cache component is configured to store the certificate data queried from the contract database.

9. The method according to claim 8, further comprising:

generating a voting message indicating that the consensus on the proposal message fails, when no corresponding data is queried from the cache component based on the hash fingerprint and no corresponding data is queried from the contract database based on the hash fingerprint; and transmitting the voting message indicating that the consensus fails to the proposal node.

10. The method of claim 7, wherein reaching the consensus on the proposal message based on the acquired certificate data comprises:

determining a proposal node associated with the acquired certificate data, and verifying whether the proposal node is consistent with a primary node selected in a current consensus view; and triggering the verification node to perform an operation of verifying each piece of transaction data in the proposal message, when the proposal node is consistent with the primary node selected in the current consensus view.

11. The method of claim 10, further comprising:

executing each piece of transaction data comprised in the transaction block in the proposal message to obtain a transaction execution result of each piece of transaction data;

parsing the proposal message to obtain a transaction execution result of the proposal node for each piece of transaction data in the transaction block; and generating, if the transaction execution result corresponding to the verification node is the same as the transaction execution result of the proposal node, a voting message indicating that the consensus on the proposal message succeeds, and transmitting the voting message to the proposal node.

12. The method of claim 11, further comprising:

acquiring a to-be-on-chained node proposal transmitted by the proposal node, the to-be-on-chained node proposal comprising the certificate data of the proposal node;

reaching a consensus on the node proposal based on the certificate data comprised in the node proposal, the consensus comprising at least one of checking an identity of the proposal node or checking validity or security of transaction data in the node proposal; and generating, if the consensus on the node proposal succeeds, a voting result indicating that the consensus succeeds, and transmitting the voting result to the proposal node.

13. A block chain consensus device, comprising a memory for storing instructions and one or more processors configured to execute the instructions to cause the block chain consensus device to perform:

acquiring a to-be-consensual transaction block, the to-be-consensual transaction block being generated based on at least one piece of to-be-packaged transaction data;

acquiring a hash fingerprint of a proposal node, and perform signature endorsement on the transaction block by using the hash fingerprint of the proposal node, to obtain signature endorsement information, the hash fingerprint being determined after a hash operation is performed on certificate data corresponding to the proposal node, and combining the signature endorsement information and the transaction block, to generate a proposal message; and broadcasting the proposal message to at least one verification node in the block chain, to trigger each verification node to reach a consensus, based on the hash fingerprint of the proposal node in the proposal message, on the proposal message.

14. The block chain consensus device of claim 13 is configured to further perform:

receiving contract calling transaction data transmitted by an operation node, the contract calling transaction data comprising a contract identifier of a system contract;

performing signature endorsement on a packaged transaction block based on the certificate data of the proposal node, to generate a to-be-on-chained node proposal, the packaged transaction block comprising the contract calling transaction data; and performing block chain chaining on the certificate data of the proposal node based on the contract identifier of the system contract if it is determined that a block chain consensus on the node proposal succeeds, the contract identifier being configured for indicating to the proposal node and a verification node to store the certificate data of the proposal node into respective contract databases, and the contract database maintaining the system contract indicated by the contract identifier.

15. The block chain consensus device of claim 14 is configured to further perform:

broadcasting the to-be-on-chained node proposal to the at least one verification node in the block chain to trigger each verification node to perform block chain chaining on the certificate data corresponding to the proposal node;

receiving a voting result transmitted by each verification node, the voting result being generated after a verification node reaches a consensus on the to-be-on-chained node proposal; and acquiring a hash fingerprint of the certificate data of the proposal node, and associating and storing the certificate data and the hash fingerprint of the proposal node into the contract database of the proposal node, if it is determined, based on each received voting result, that a block chain consensus on the node proposal succeeds.

16. The block chain consensus device of claim 14, wherein performing block chain chaining on the certificate data corresponding to the proposal node comprises:

generating, if it is determined, based on each received voting result, that the consensus on the node proposal succeeds, a notification message indicating that the consensus on the node proposal succeeds, the notification message carrying the contract identifier of the system contract; and transmitting the notification message to each verification node in the block chain, the notification message being configured for triggering a verification node to store the certificate data of the proposal node into a contract database corresponding to the verification node, wherein a system contract maintained in the contract database corresponding to the verification node recording comprises a hash fingerprint and the certificate data associated and stored for the proposal node.

17. The block chain consensus device of claim 13 is configured to further perform:

receiving a voting message transmitted by a verification node, the voting message being generated after the verification node reaches a consensus on the proposal message, and reaching the consensus on the proposal message comprising:

verifying that a transaction execution result of the proposal node for each piece of transaction data in the transaction block is consistent with a transaction execution result of the verification node for each piece of transaction data in the transaction block; and verifying that the proposal message is generated by the proposal node; and performing, if the verification node reaches a consensus on the proposal message based on the voting message, block chain chaining on a transaction block corresponding to the proposal message.

18. The block chain consensus device of claim 13 is configured to further perform:

acquiring acquisition time of each piece of the one or more pieces of to-be-packaged transaction data, and sorting an execution sequence of the one or more pieces of transaction data based on the acquisition time of each piece of transaction data, to determine a transaction execution sequence of each piece of transaction data; and packaging the transaction execution sequence into the proposal message, the transaction execution sequence being configured for triggering a verification node that receives the proposal message to execute each piece of transaction data in the transaction block in a sequence indicated by the transaction execution sequence.

19. A block chain consensus apparatus, comprising a receiving unit and a processing unit, the block chain consensus apparatus being configured to execute the method of claim 7.

20. A non-transitory computer-readable storage medium, the computer-readable storage medium having computer-readable instructions stored thereon, and the computer-readable instructions being loaded and executed by a processor to implement the method of claim 7.

* * * * *